US011571969B2

(12) United States Patent
Domeyer et al.

(10) Patent No.: US 11,571,969 B2
(45) Date of Patent: Feb. 7, 2023

(54) EXTERNAL COMMUNICATION SUPPRESSION DEVICE FOR DRIVING AUTOMATION

(71) Applicant: TOYOTA MOTOR ENGINEERING & MANUFACTURING NORTH AMERICA, INC., Plano, TX (US)

(72) Inventors: Joshua E. Domeyer, Madison, WI (US); Benjamin P. Austin, Saline, MI (US); John K. Lenneman, Okemos, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 320 days.

(21) Appl. No.: 16/892,919

(22) Filed: Jun. 4, 2020

(65) Prior Publication Data
US 2021/0379992 A1  Dec. 9, 2021

(51) Int. Cl.
*B60K 35/00* (2006.01)
*B60W 50/14* (2020.01)
*B60W 60/00* (2020.01)

(52) U.S. Cl.
CPC ............. *B60K 35/00* (2013.01); *B60W 50/14* (2013.01); *B60W 60/0053* (2020.02);
(Continued)

(58) Field of Classification Search
CPC ............. B60W 60/0053; B60W 50/14; B60W 2555/20; B60W 2520/10; B60K 2370/195; B60K 2370/11; B60K 2370/175
(Continued)

(56) References Cited

U.S. PATENT DOCUMENTS

| 7,889,065 B2 | 2/2011 | Smith |
| 9,495,874 B1 | 11/2016 | Zhu et al. |

(Continued)

FOREIGN PATENT DOCUMENTS

| CN | 108297880 A | * | 7/2018 | ............ B60W 40/08 |
| WO | WO-2015134376 A1 | * | 9/2015 | ......... A61B 5/02055 |

(Continued)

OTHER PUBLICATIONS

Takuma et al., "A Human Machine Interface Framework for Autonomous Vehicle Control," 2017, Publisher: IEEE.*

(Continued)

*Primary Examiner* — Tuan C To
(74) *Attorney, Agent, or Firm* — Oblon, McClelland, Maier & Neustadt, L.L.P.

(57) ABSTRACT

A method, system and non-transitory computer readable medium for suppressing autonomous vehicle external human machine interface (eHMI) notifications to prevent confusion or distraction of a road user. The suppression conditions are based on situations where the eHMI notification is redundant, not necessary, can be simplified or should be modified due to weather or light intensity. The eHMI notifications can be suppressed on selected displays and enhanced on others. The eHMI notifications can include text and icons, flashing lights, color or light patterns, which can be modified or suppressed based on the determination that the eHMI notification will confuse or distract the road user. At a four-way stop intersection, the eHMI notification can be suppressed until the autonomous vehicle has the right-of-way. The autonomous vehicle can form a mesh network with connected vehicles at the intersection and broadcast a group eHMI while requesting that the connected vehicles suppress their eHMIs.

24 Claims, 14 Drawing Sheets

(52) U.S. Cl.
CPC ..... *B60K 2370/11* (2019.05); *B60K 2370/175* (2019.05); *B60K 2370/195* (2019.05); *B60W 2520/10* (2013.01); *B60W 2555/20* (2020.02)

(58) Field of Classification Search
USPC .......................................................... 701/36
See application file for complete search history.

(56) References Cited

U.S. PATENT DOCUMENTS

| | | | |
|---|---|---|---|
| 9,701,239 B2 | 7/2017 | Kentley et al. | |
| 10,026,309 B1 | 7/2018 | Nepomuceno et al. | |
| 2012/0268260 A1 | 10/2012 | Miller et al. | |
| 2017/0240098 A1* | 8/2017 | Sweeney | B60Q 1/381 |
| 2017/0253181 A1* | 9/2017 | Choi | G06T 11/00 |
| 2018/0126901 A1* | 5/2018 | Levkova | G06V 40/161 |
| 2018/0257668 A1* | 9/2018 | Tonshal | H04W 4/023 |
| 2018/0286150 A1* | 10/2018 | Chen | G06F 3/04817 |
| 2018/0359207 A1* | 12/2018 | Chatterjee | H04L 67/535 |
| 2019/0308640 A1* | 10/2019 | Miller | B60W 30/182 |
| 2020/0017106 A1* | 1/2020 | Park | B60Q 9/00 |
| 2020/0139992 A1* | 5/2020 | Oba | G08G 1/16 |
| 2020/0192365 A1* | 6/2020 | Russell | G06T 7/70 |
| 2020/0254927 A1* | 8/2020 | Motegi | B60Q 1/268 |
| 2020/0262424 A1* | 8/2020 | Kong | G05D 1/0212 |
| 2021/0197831 A1* | 7/2021 | Choi | G07C 5/0808 |
| 2021/0229707 A1* | 7/2021 | Akash | G06V 20/597 |

FOREIGN PATENT DOCUMENTS

| | | | | |
|---|---|---|---|---|
| WO | WO-2018026603 A1 * | 2/2018 | ............ | B60W 30/00 |
| WO | WO-2018085804 A1 * | 5/2018 | ............... | B60Q 9/00 |

OTHER PUBLICATIONS

Arturo et al., "iDriver—Human Machine Interface for Autonomous Cars," 2011, Publisher: IEEE.*

"Automated Driving—Summary of SAE International's Levels of Driving Automation for On-Road Vehicles", SAE International Standard J3016, wrww.sae.org/autodrive, Jan. 2014, 2 pages.

* cited by examiner

EXTERNAL COMMUNICATION SUPPRESSION DEVICE FOR DRIVING AUTOMATION

BACKGROUND

Technical Field

The present disclosure is directed to suppression of external human machine interface (eHMI) notifications from autonomous vehicles during situations when the notification would be distracting or confusing to a road user.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Providing road users (e.g., pedestrians, cyclists, etc.) with external notification of the autonomous vehicle intent, e.g., slowing down, proceeding through the pedestrian crossing, etc., has been a matter of interest. In the coming years, more and more autonomous vehicles will have eHMI, which may introduce unintended consequences, i.e., confusion to road users. There is a need to suppress eHMI under certain conditions such that road users are not unnecessarily distracted.

Accordingly, it is one object of the present disclosure to provide methods and systems for monitoring the external environment for distracting or confusing conditions where the use of the eHMI notification could confuse road users and subsequently suppressing the eHMI under such conditions.

SUMMARY

The present disclosure provides methods and systems to monitor the external environment around an autonomous vehicle for conditions when external human-machine interface (eHMI) notifications (i.e., notifications of autonomous vehicle intent in the form of external light bars, flashing lights added to the front of the vehicle, etc.) may confuse or distract road users and as a result of such conditions, suppress the eHMI.

In an exemplary embodiment, a method for suppression of external human machine interface (eHMI) notifications to prevent confusion or distraction of a road user is described, comprising suppressing the eHMI notifications of an autonomous vehicle, wherein suppressing is based on at least one suppression condition including the autonomous vehicle is following another vehicle within a predetermined distance, the autonomous vehicle is travelling on a high speed roadway on which road users are not present, the autonomous vehicle is transitioning to manual mode, detecting sensor failure, detecting a reduction in visibility of the eHMI based on adverse weather conditions, detecting a location of a road user within a proximity threshold, detecting autonomous and non-autonomous vehicles at a four way stop, detecting that all vehicles within a threshold distance are autonomous vehicles, and detecting a reduction in visibility of the eHMI due to light intensity changes based on time of day.

In another exemplary embodiment, a system for suppression of autonomous vehicle external human machine interface (eHMI) notifications to prevent confusion or distraction of a road user is described, comprising a plurality of sensors configured to generate images of the surrounding environment, the plurality of sensors including vehicle external cameras, LiDAR sensors and radar sensors, a plurality of eHMI notification displays located at different external positions, wherein the plurality of notification displays are configured for independent activation, a computing device operatively connected to the plurality of sensors and plurality of notification devices, the computing device including a computer-readable medium comprising program instructions, executable by processing circuitry, to cause the processing circuitry to suppress the eHMI notifications based on at least one suppression condition including the autonomous vehicle is following another vehicle within a predetermined distance, the autonomous vehicle is travelling on a high speed roadway on which road users are not present, the autonomous vehicle is transitioning to manual mode, detecting sensor failure, detecting a reduction in visibility of the eHMI based on adverse weather conditions, detecting a location of a road user within a proximity threshold, detecting autonomous and non-autonomous vehicles at a four way stop, detecting that all vehicles within a threshold distance are autonomous vehicles, and detecting a reduction in visibility of the eHMI due to light intensity changes based on time of day.

In another exemplary embodiment, a non-transitory computer readable medium having instructions stored therein that, when executed by one or more processor, cause the one or more processors to perform a method suppression of external human machine interface (eHMI) notifications to prevent confusion or distraction of a road user is described, comprising suppressing the eHMI notifications of an autonomous vehicle, wherein suppressing is based on at least one suppression condition including the autonomous vehicle is following another vehicle within a predetermined distance, the autonomous vehicle is travelling on a high speed roadway on which road users are not present, the autonomous vehicle is transitioning to manual mode, detecting sensor failure, detecting a reduction in visibility of the eHMI based on adverse weather conditions, detecting a location of a road user within a proximity threshold, detecting autonomous and non-autonomous vehicles at a four way stop, detecting that all vehicles within a threshold distance are autonomous vehicles, and detecting a reduction in visibility of the eHMI due to light intensity changes based on time of day.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
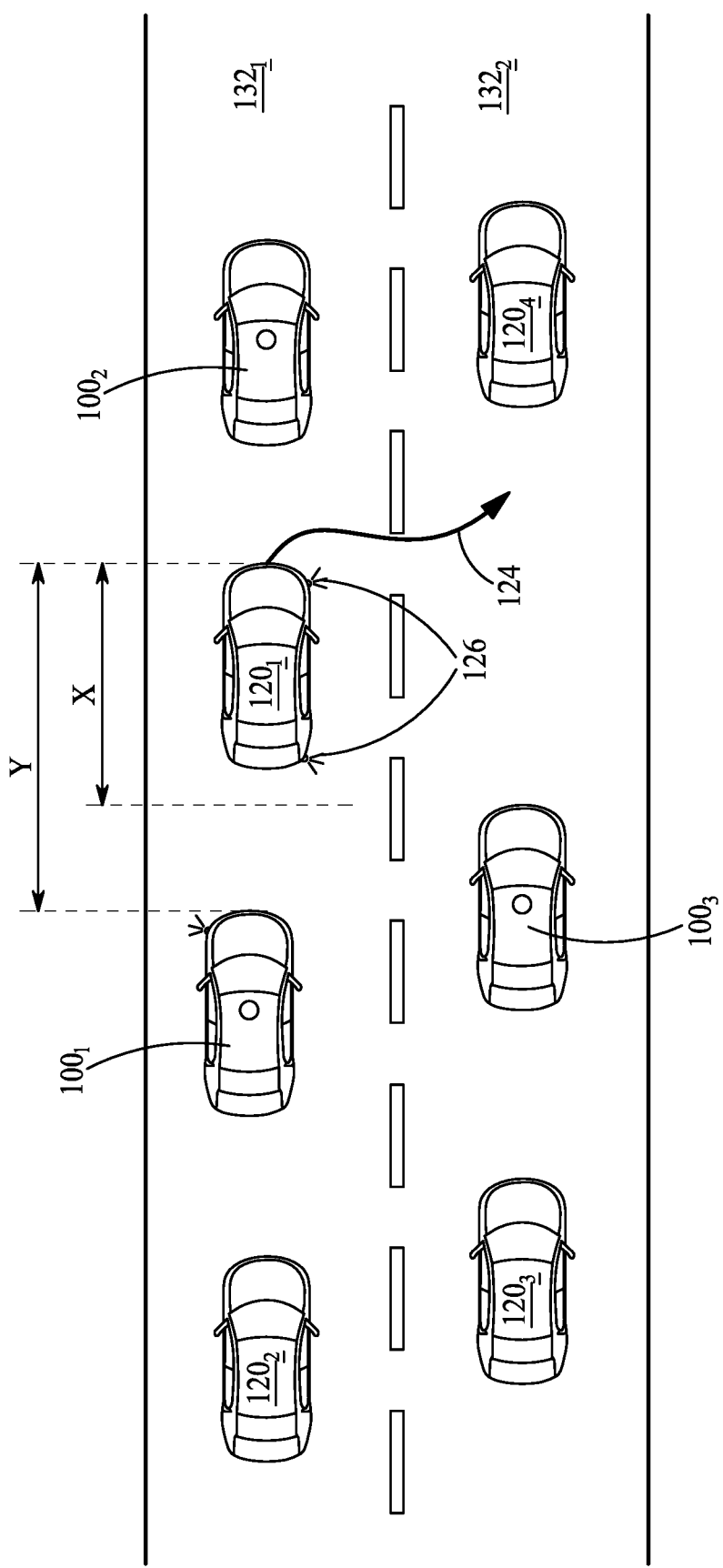
FIG. 1 illustrates the first eHMI suppression condition, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

In the present disclosure, "road user" is defined as any of a non-autonomous vehicle, a pedestrian, a motorcyclist, a bicyclist, any human driven conveyance or autonomous vehicles operating in manual mode. "Road user" as defined in the present disclosure does not include autonomous or self-driving vehicles.

"Autonomous vehicle" means a vehicle capable of navigating roadways and interpreting traffic-control devices without a driver actively operating any of the vehicle's control systems. The term "autonomous vehicle" excludes a motor vehicle enabled with active safety systems or driver-assistance systems, including systems to provide electronic blind-spot assistance, crash avoidance, emergency braking, parking assistance, adaptive cruise control, lane-keep assistance, lane-departure warning, or traffic jam and queuing assistance, unless the system alone or in combination with other systems enables the vehicle on which the technology is installed to drive without active control or monitoring by a human operator.

An autonomous vehicle is capable of sensing its environment and navigating with little or no user input. It senses the environment by using vehicle sensing devices such as radar, LiDAR, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

Autonomous vehicles typically include communication systems which are capable of exchanging information with other nearby autonomous vehicles about their trajectories, speed, intent to make turns, etc. A vehicle which includes a communication system is called a "connected vehicle" and may be autonomous, semi-autonomous or non-autonomous. The driver of a non-autonomous vehicle may be able to perceive the intent of other road users and take appropriate action to signal his/her intent and avoid the road user. For example, the driver may use a hand signal, a head nod, or other changes in body movement or posture to indicate that his/her intent is to let a pedestrian pass through an intersection before proceeding. However, an autonomous vehicle must use sensors to perceive the intent of non-autonomous road users and pedestrians and may communicate its movements by signaling, flashing lights or electronic vehicle intent (eHMI) notifications. If there are many autonomous vehicles on a roadway communicating by signaling, flashing lights or eHMI notifications, the road user may become confused or be distracted.

Aspects of this disclosure are directed to a method for suppression of autonomous vehicle external human machine interface (eHMI) notifications to prevent confusion or distraction of a road user, a system for suppression of autonomous vehicle external human machine interface (eHMI) notifications to prevent confusion or distraction of a road user and a non-transitory computer readable medium having instructions stored therein that, when executed by one or more processors, cause the one or more processors to perform a method for suppression of external human machine interface (eHMI) notifications to prevent confusion or distraction of a road user.

In aspects of the present disclosure, a computing device of an autonomous vehicle monitors the external environment for certain conditions that may confuse or distract a road user using, e.g., existing vehicle sensors, vehicle-to-vehicle (V2V) communication, vehicle-to-infrastructure/infrastructure-to-vehicle (V2I/I2V) communication, etc. The computing device then suppresses the vehicle intent notification, i.e., the eHMI. The eHMI notification may be suppressed on some vehicle displays and enhanced on other displays. For example, enhancement may include using halogen lights, a ring of halogen lights, a pattern of colors, an increase in intensity, or the like. Subsequently, the autonomous vehicle continues with standard signaling, i.e., turn signals, brake lights, etc., and disables the eHMI notification to prevent road user confusion under the following conditions.

The eHMI suppression conditions are:
1. When the autonomous vehicle is following another vehicle within a predetermined distance:
   a. The other vehicle may be a manually driven vehicle or an autonomous vehicle not operating in autonomous mode, but the eHMI from the autonomous vehicle behind the vehicle may distract the road user.
2. High-speed situations, e.g., on a highway, where slower speed road users, such as pedestrians and bicyclists, are typically not present on highways and the eHMI is not needed and would distract or confuse surrounding non-autonomous vehicles.
3. An upcoming transition to the manual mode is detected, i.e., the driver becomes the one providing vehicle intent signaling.
4. Detected sensor failures.
5. Weather conditions where the visibility is affected, e.g., heavy fog, heavy rain, etc.
   a. Alternatively, the eHMI notifications may be enhanced on certain displays with special capabilities, such as halogen or LED lights, to provide better visibility to road users during these weather conditions, while eHMI notifications on displays without the enhancement capability are suppressed.
6. In the situation where a pedestrian runs out in front of the vehicle or jaywalks in front of the vehicle, an eHMI would only confuse the pedestrian and other road users.
7. Conditions where eHMI can be minimized, e.g., a four-way stop where all vehicles do not need to broadcast eHMI, only one vehicle at a time.
    a. Additionally, if two or more vehicles can negotiate the eHMI for the group, e.g., the lead vehicle in a platoon can provide the eHMI while the other autonomous or semi-autonomous vehicles suppress their eHMIs.
8. When all vehicles in an area are autonomous vehicles and there are no pedestrians, bicyclists, non-autonomous vehicles or other road users within the area, all eHMI notifications are suppressed.
9. Time of day may affect the eHMI message or display choice.
    a. Night driving conditions may require switching to halogen only displays to reduce glare.
    b. Very bright sunlight at noon or glare at sunrise may require suppression of rotating flashing lights or windshield displays to reduce "blinding" of a road user due to reflection from metal and glass in the surrounding environment.
    c. Twilight may require enhancement of the intensity or a change of color of the eHMIs in order to provide better visibility of the notification.

In an aspect of the present disclosure, the autonomous vehicle may identify a road user by images formed from data recorded by a plurality of vehicle sensors.

The plurality of vehicle sensors may include a plurality of cameras located around the vehicle. Camera images, for example, may be timestamped by an image processor and analyzed for changes in motion, head pose and body posture.

The plurality of vehicle sensors may include a plurality of LiDAR sensors. The autonomous vehicle may identify a road user by a series of images recorded by a LiDAR (light detection and ranging) rotating 360 degree scanner. LiDAR acts as an eye of an autonomous (self-driving) vehicle. It provides a 360-degree view of the surrounding area.

A continuously rotating LiDAR system sends thousands of laser pulses every second. These pulses collide with the surrounding objects and reflect back. The resulting light reflections are then used to create a 3D point cloud. The vehicle onboard computer records the reflection point of each laser and translates this rapidly updating point cloud into an animated 3D representation. The 3D representation is created by measuring the speed of light and the distance covered from the LiDAR device to an object and back to the LiDAR device (time of flight measurements) which helps to determine the position of the vehicle with respect to other surrounding objects.

The 3D representation may be used to monitor the distance between the autonomous vehicle and any other vehicles or pedestrians on the road passing by, in front, behind or in a common trajectory with the autonomous vehicle. Image processing of the LiDAR signals enables the vehicle to differentiate between a person on a bicycle or a person walking, and their speed and direction. The 3D representation may also be used to determine when to command the brakes to slow or stop the vehicle, or to speed up when the roadway is clear.

Additionally, the plurality of vehicle sensors may be radar sensors used to detect road users. The computer of the vehicle is configured to use data gathered by camera image analysis, LiDAR 3D point cloud analysis and radar to determine the gaze direction of the road user.

The autonomous vehicle may include a computing device having circuitry and stored program instructions that, when executed by one or more processor, determine the intent of the road user to enter a trajectory of the autonomous vehicle and whether the road user is able to see the autonomous vehicle.

An autonomous vehicle may include a guidance system which makes use of the cameras, LiDAR scanners and radar images to determine images of the surrounding environment and moving objects. The autonomous vehicle may also connect in a mesh network with nearby autonomous vehicles to determine their trajectories, intention to change trajectory and moving objects sensed in their surroundings. "Nearby" is defined as a distance "F" which may be any of 50 feet, 100 feet, 500 feet, 1000 feet, 1000 yards, or in the range of zero to 1000 yards, and depends on the environmental region (urban, rural, suburbs, the speed limit of the roadway, environmental factors, or the like. The processor may access image analysis circuitry which can use camera images, 3D point cloud and radar data to stitch together a representation of the surroundings of the autonomous vehicle, and provide this representation to the autonomous guidance system. Movement within the surrounding environment can include current traffic and roadway conditions, nearby entities, autonomous vehicle status (e.g., speed, direction, etc.), and other data. Object recognition and computer vision techniques may be applied to the image data to identify road users, such as pedestrians, bicyclists and non-autonomous vehicles, as well as intersections and crosswalks. A global view is developed by combining the representation of the surrounding environment with the map data. The boundary of the global view is the range of the sensors of the autonomous vehicle combined with the range of sensors of nearby autonomous vehicles.

In an aspect of the present disclosure, an autonomous vehicle uses the sensing devices, such as LiDAR, cameras, and radar, to monitor the external environment in which the autonomous vehicle is located. Monitoring the external environment can include generating image data which includes information regarding the external environment and adding the image data to a map of the external environment. The map can include GPS data. The map data may be stored in the computing device of the autonomous vehicle and connected periodically to a map server to update the map data. Alternatively, the view of the external environment may be generated from the sensor data alone and not include GPS or map data.

The eHMI notifications may be displayed on any of a plurality of locations on the autonomous vehicle. The displays may be located on the external surface of the autonomous vehicle, or may be located on internal surfaces, such as a windshield or door window, facing towards the exterior of the autonomous vehicle. The displays may be liquid crystal display (LCD) screens, light-emitting diodes (LED) screens, a combination of a screen and a projector, or a roof top projector configured to project an image on the road surface. The displays may be bands of lights configured to flash in a pattern or sequence and according to a flashing profile which indicate the vehicle intent to a road user. For example, a band of lights may flash all lights in the band on and off when at a first distance to a road user, and may flash fewer lights as the vehicle approaches a stop. At least one display may be a flashing light (typically on the roof of the autonomous vehicle) which flashes in a pattern which indicates a "heartbeat" of the autonomous vehicle. The "heartbeat" may indicate to road users that the vehicle is in autonomous mode. Further, the displays may be configured for adjustable positioning in order to display the message in the line of sight of the road user.

A computing device in the autonomous vehicle may include processing circuitry including an environment mapper and a trajectory predictor which are configured to predict a trajectory of a road user through the environment based on identifying various contextual cues associated with the road user. In an example, if the road user is a pedestrian, the environment mapper may use the location, head pose, walking speed, body posture, and the like, to identify the gaze direction and perform a multi-gait analysis of the pedestrian's motion by detecting changes in motion, head pose, body posture, arm swing, stride length, mood state, direction of movement and gait. An environment mapper may access a database of stored sets of images associated with poses, body posture, walking speeds, and the like, and may match each current image to a stored image to determine multi-gait analysis and the gaze direction. A trajectory predictor may predict the trajectory of a pedestrian road user from the gaze direction, location, speed and other body cues.

Similarly, if the road user is a bicyclist, the environment mapper may use the location, head pose, speed, body posture changes (e.g., swinging motion, side to side motion, position of feet on the pedals, and the like) to identify the gaze direction and estimate the trajectory and speed of the bicyclist. The environment mapper may access a database of stored sets of images associated with poses, body posture, speeds, and the like, and may match each stitched image to a stored image to determine a gaze direction, trajectory and intent of the bicyclist to depart from the trajectory. The trajectory predictor may use the head pose, speed, body posture changes to predict a trajectory of the bicyclist.

In a third example, if the road user is a non-autonomous vehicle, the environment mapping unit may or may not be able to identify the intent of the driver. A computing device of the autonomous vehicle may use the cameras, LiDAR and radar to determine the distance of the non-autonomous vehicle, its speed and trajectory to judge its intent.

Illustrations and examples of the eHMI suppression conditions are described below.

FIG. 1 is an illustration of a one-way roadway having two lanes, $132_1$ and $132_2$. Autonomous vehicles $100_1$, $100_2$ and $100_3$ (generally an autonomous vehicle is identified as $100$) and non-autonomous vehicles $120_1$, $120_2$, $120_3$ and $120_4$ are travelling on the roadway. In an example of the first eHMI suppression condition, non-autonomous vehicle $120_1$ may be a vehicle without self-driving capability or may be an autonomous vehicle which has switched to manual mode. In either case, non-autonomous vehicle $120_1$ is controlled by a driver. The driver of non-autonomous vehicle $120_1$ wants to change lanes along trajectory $124$ and indicates this trajectory change by slowing slightly and turning on the right turn signals $126$. Autonomous vehicle $100_1$ is travelling at a distance Y from non-autonomous vehicle $120_1$ and its computing device perceives the flashing lights from the right turn signals $126$ and that the distance between vehicles $100_1$ and $120_1$ has decreased to distance X. The computing device of the autonomous vehicle $100_1$ may use camera images to perceive the flashing of the turn signals and may use radar to perceive that the distance Y has decreased to distance X. In this situation, the driver of non-autonomous vehicle $120_1$ must turn his head to determine the position of autonomous vehicle $100_3$ while monitoring autonomous vehicle $100_2$ and non-autonomous vehicle $120_4$ for changes in speed and position. An eHMI notification on the front windshield or roof of autonomous vehicle $100_1$ would distract the driver, therefore the computing device of autonomous vehicle $100_1$ suppresses the eHMI notification. The computing device may suppress some eHMI notifications on the vehicle and express others. For example, the autonomous vehicle may suppress all eHMI notifications except for a "heartbeat" pulse.

The distances X and Y may be monitored by line-of-sight determination using radar or LiDAR sensors, as conventionally known. The distance X may be predetermined based on the speed, environmental conditions, roadway conditions, number of crossing streets, and the like. For example, a "safe" distance X at 50 mph may be two cars lengths, or 30 feet. If the distance Y between the vehicles decreases to less than X, autonomous vehicle $100_1$ would slow to increase the distance and take the distance into account when determining whether or not to suppress the eHMI notification.

The spatial relationship between two vehicles, such as $100_1$ and $120_1$ is not limited to calculation of car lengths or distances. This relationship may be defined by time to collision or by relative vehicle speeds.

Figure 2:
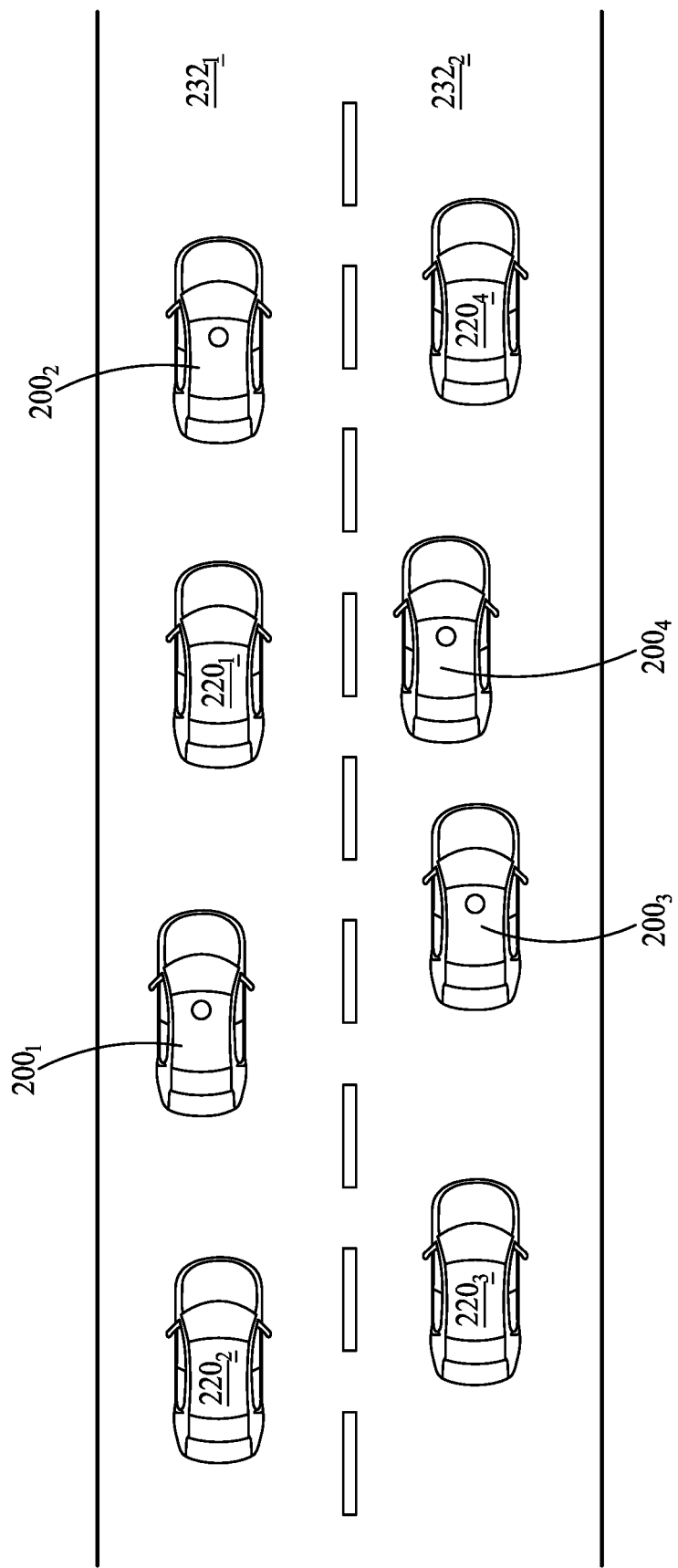
FIG. 2 illustrates the second eHMI suppression condition, according to certain embodiments.

In an example of the second eHMI notification suppression condition, FIG. 2 shows a plurality of vehicles travelling on a two lane, high-speed, one-way highway which does not allow pedestrian or bicycle travel. In this situation, there is less need for a plurality of eHMI notifications, which may be distracting or confusing to non-autonomous vehicles $220_1$-$220_4$. For example, front, rear and side window eHMI notifications from surrounding autonomous vehicles $200_1$-$200_4$ may be distracting to the drivers of non-autonomous vehicles $220_1$-$220_4$. The eHMI notifications may be suppressed when the vehicle is travelling above a predetermined speed. For example, an autonomous vehicle travelling at 35-45 mph and not exceeding the speed limit is most likely travelling in city traffic or in a residential neighborhood. In this situation, the eHMI notifications are crucial to avoiding accidents with pedestrians and non-autonomous vehicles. However, if the autonomous vehicle is travelling at or above 55 mph on a roadway rated for such speed, under normal driving conditions the roadway is most likely a highway which would not have side streets or pedestrians, bicyclists or other vehicles which might dart out of side streets. In this situation, all eHMI notifications may be suppressed. If the autonomous vehicle is travelling on a highway and intends to slow down to exit the highway, an eHMI notification can then be exhibited to warn other drivers of his intent to exit.

An autonomous vehicle, as defined in the present disclosure, is a vehicle which is capable of self-driving without a human driver. However, autonomous vehicles may have full, partial or conditional levels of automation as defined by conditions 3-5 of the SAE International J3016 standard (see "Automated driving levels of driving automation are defined in new SAE International Standard J3016", SAE International, 1 Jul. 2018, incorporated herein by reference in its entirety). The SAE (J3016) automation levels for higher automation levels are shown in Table 1. The automation levels 3-5 show the degree of control for automated vehicles. At each level, the vehicle monitors the driving environment.

TABLE 1

SAE (J3016) Automation Levels

| SAE Level | Level of Automation | Narrative Definition | | Executes Steering, Accel., Decel. | Monitoring of driving environment | Fallback performance of dynamic driving task | System capability (driving modes) |
|---|---|---|---|---|---|---|---|
| 3 | Conditional | Driving mode-specific performance by an automated driving system of all aspects of the dynamic driving task | Human driver controls upon request | System | System | Human Driver | Some Driving Modes |
| 4 | High | | System control when human driver does not respond appropriately | | | System | Many Driving Modes |
| 5 | Full | | System control under all roadway and environmental conditions that can be managed by a human driver | | | | All Driving Modes |

The third suppression condition concerns an upcoming transition from autonomous to manual mode. Under this condition, the autonomous vehicle suppresses the eHMI. The driver takes control of providing the vehicle intent signaling. During the handoff from automated driving to manual driving, which may become necessary due to unfavorable or unusual road conditions, or if the vehicle has limited capabilities, a sudden handoff could leave a human driver dangerously unprepared in the moment. Under this condition, eHMI notifications could distract or confuse the driver.

The fourth suppression condition concerns sensor failure. If the computing device detects sensor failure, a lack of confidence in decisions made based on the representation of the surrounding environment may result. EHMI notifications are suppressed during sensor failure to avoid confusing road users with false or suspect information.

The fifth suppression condition concerns suppression of an eHMI notification under different weather conditions. The eHMI notification may be suppressed in heavy rain as a road user may not be able to view the notification through the distortion of the heavy rain. Under heavy rain and heavy fog conditions, the eHMI may be expressed only on displays which have halogen, xenon or LED fog light bulbs and other displays may be suppressed. EHMI notifications can be shortened or use icons only to convey the information in a more readable format. Under heavy snow conditions, snow on the windshield of the autonomous vehicle may distort the eHMI notification and glare from the snowflakes can blind to a road user. In this situation, all eHMI notifications should be suppressed other than for those displays which have halogen, xenon or LED fog light bulbs.

Alternatively, the eHMI display may be enhanced by improving the contrast or changing to colors which may be more visible under the weather conditions described above. Amber light bulbs provide better visibility and contrast in heavy fog. Displays having amber light bulbs or which can be turned to amber should be used in heavy fog, rain or snow and the eHMI notifications of other displays should be suppressed.

The sixth suppression condition concerns the situation where a pedestrian or bicyclist runs out in front of the autonomous vehicle or jaywalks (walks across the street outside of a crosswalk) in front of the autonomous vehicle. In this situation, the eHMI notification would confuse the pedestrian and other road users, thus should be suppressed.

Figure 3A:
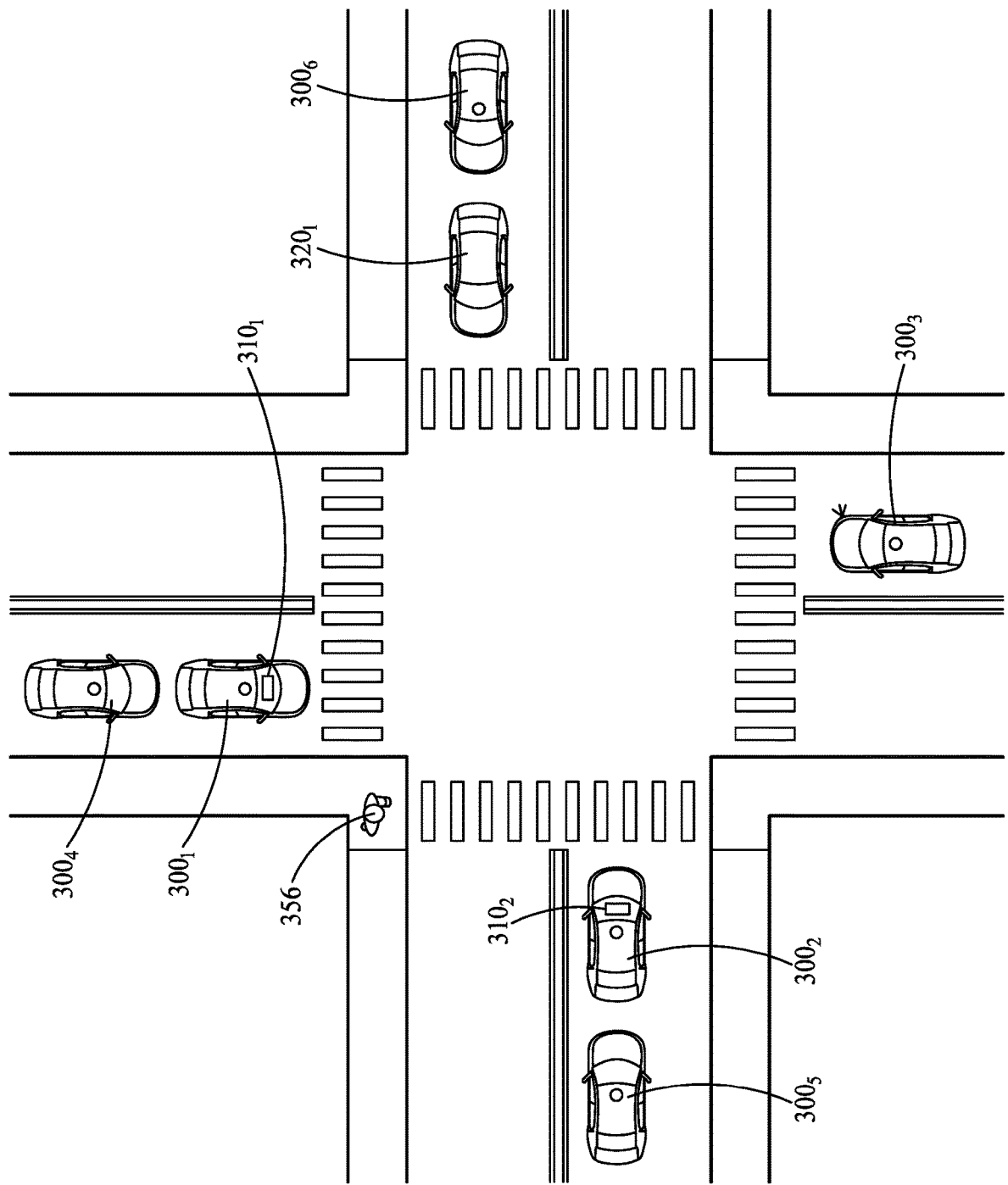
FIG. 3A illustrates the seventh eHMI suppression condition for an autonomous vehicle, according to certain embodiments.

The seventh suppression conditions concerns vehicles at a four-way stop intersection. In this situation, only one vehicle at a time needs to broadcast an eHMI notification, and each autonomous vehicle suppresses its eHMI notifications until it is its turn to proceed through the four-way stop. An example of this situation is shown in FIG. 3A. In a non-limiting example shown in FIG. 3A, autonomous vehicles $300_1$, $300_2$, $300_3$, $300_4$, $300_5$, $300_6$ and non-autonomous vehicle $320_1$ are at four-way stop. Pedestrian 356 is also waiting to cross in front of autonomous vehicle $300_2$. Vehicle $300_1$ was the first to arrive at the intersection, and an eHMI notification $310_1$ "Driving" is broadcast on its front window or roof top display. Vehicle $300_2$ broadcasts "Stopped" on its front window or roof top display. Pedestrian 356 has right of way on the crosswalk in front of autonomous vehicle $300_2$. Once the pedestrian reaches the other end of the crosswalk, autonomous vehicle $300_2$ suppresses its eHMI notifications until it has the right of way. Autonomous vehicle $300_3$ intends to turn right, therefore its right side blinkers are on, but does not display an eHMI, as it is not its turn to proceed. Vehicle $320_1$ sees the "Driving" notification on autonomous vehicle $300_1$ informing it that it must wait its turn. After autonomous vehicle $300_1$ passes through the intersection, autonomous vehicle $300_4$ moves up to the intersection and suppresses its eHMI notifications. Once the pedestrian has crossed the street, autonomous vehicle $300_2$ has the right of way. The eHMI notification "Driving" is broadcast on its front window or rooftop display $310_2$, while autonomous vehicle $300_3$ continues to suppress its notifications. Additionally, there is no need for autonomous vehicles $300_4$, $300_5$ or $300_6$ to broadcast an eHMI at this time, so these are suppressed. At this time, non-autonomous vehicle $320_1$ is also free to drive forward, as autonomous vehicle $300_2$ has indicated that it is driving straight through and not turning. Once autonomous vehicle $300_2$ and non-autonomous vehicle $320_1$ have passed through the intersection, autonomous vehicles $300_5$ and $300_6$ move up to their respective stop signs. Autonomous vehicle $300_3$ has the right of way, and broadcasts an eHMI notification "Turning right" and negotiates the turn. At this time, autonomous vehicles $300_4$, $300_5$ and $300_6$ continue to suppress their eHMI notifications. Once autonomous vehicle $300_3$ has completed its turn, vehicle $300_4$ has the right of way (as autonomous vehicles $300_5$ and $300_6$ arrived later at the four way stop) and broadcasts "Driving" on an eHMI display, while autonomous vehicles $300_5$ and $300_6$ suppress their eHMI notifications. Other arriving vehicles (not shown) may continually move toward the four-way stop intersection. Autonomous vehicles equipped with the suppression algorithm of the present disclosure will broadcast or suppress their eHMIs in the manner described above, thus minimizing distraction and confusion for other road users.

Table 2 shows the above described example of a four way stop scenario with respect to time, for six consecutive time periods.

TABLE 2

Example of eHMI Suppression at Four Way Stop

| Vehicle | eHMI | | | | | |
|---|---|---|---|---|---|---|
| | T1 | T2 | T3 | T4 | T5 | T6 |
| $300_1$ | Driving | — | — | — | — | — |
| $300_2$ | Okay to Walk | Driving | — | — | — | — |
| $300_3$ | Suppress | Suppress | Turn R | — | — | — |
| $320_1$ | N/A | (may drive) | N/A | N/A | N/A | N/A |
| $300_4$ | Suppress | Suppress | Suppress | Driving | — | — |
| $300_5$ | Suppress | Suppress | Suppress | Suppress | Driving | Suppress |
| $300_6$ | Suppress | Suppress | Suppress | Suppress | Suppress | Driving |

Figure 3B:
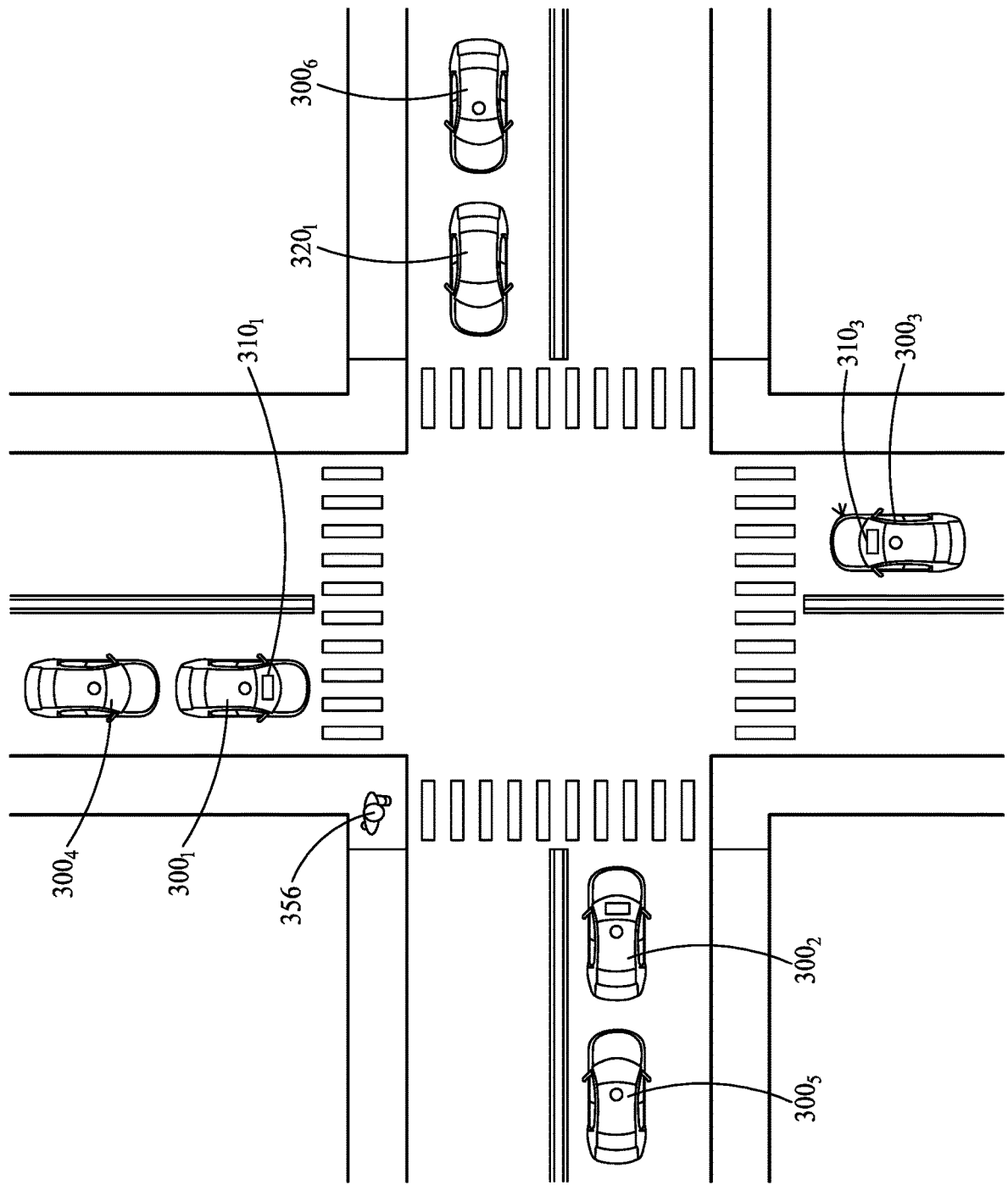
FIG. 3B illustrates the seventh eHMI suppression condition for a platoon of autonomous vehicles, according to certain embodiments.
Figure 4:
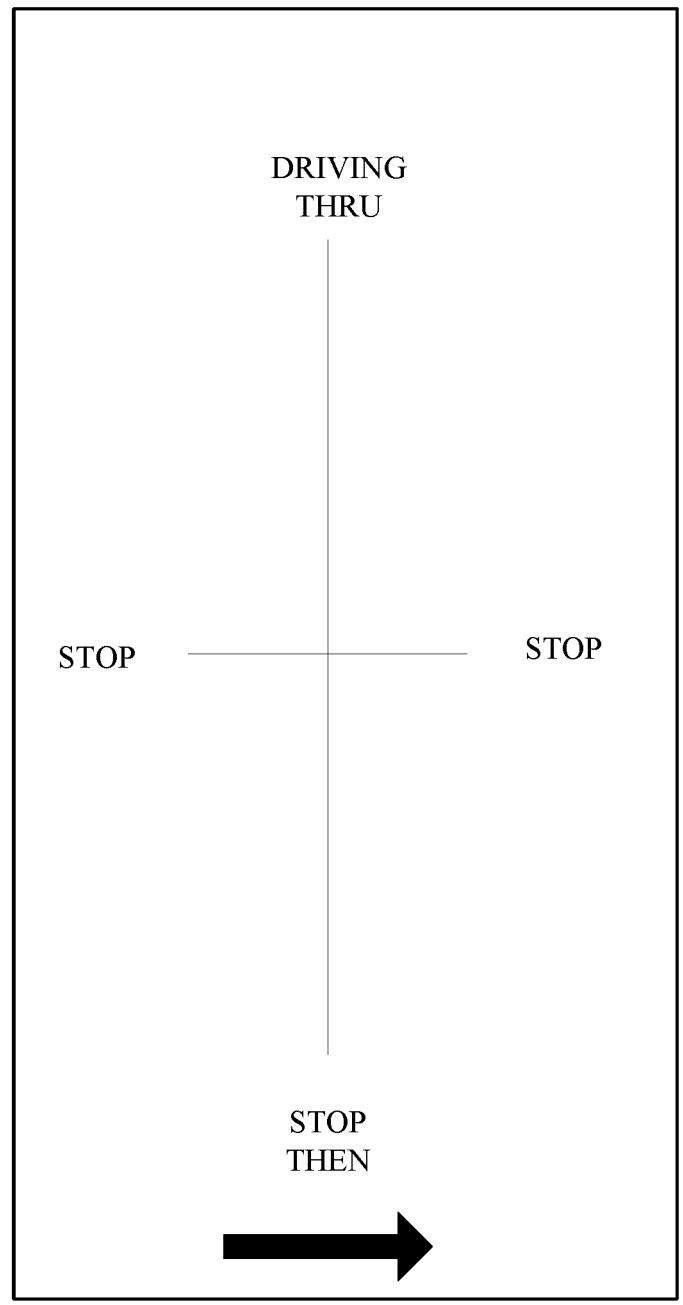
FIG. 4 is a group eHMI notification which may be used under the eHMI suppression conditions of FIG. 3B, according to certain embodiments.

Additionally, autonomous vehicles may connect in a mesh network with surrounding connected vehicles. The computing device of the autonomous vehicle may transmit a request to form a mesh network to other connected or autonomous vehicles at the four-way stop. Upon positive response to the request, the autonomous and connected vehicles form the mesh network, elect a "cluster head" and transmit their sensor data and intent to move through the four-way stop to the cluster head, thus forming a "platoon" of vehicles. The cluster head displays the eHMI notifications for the platoon on its display while the eHMI notifications of the other vehicles in the platoon are suppressed. In this aspect, distraction and confusion for the road user are diminished, as the road user needs only look at one vehicle rather than trying to read a plurality of eHMI notifications. An example is shown in FIG. 3B of autonomous vehicles forming a "platoon" for eHMI communication at the four-way stop of FIG. 3A. In this example, the computing device of autonomous vehicle $300_1$ transmits a request to autonomous vehicles $300_2$-$300_6$ to form a mesh network with vehicle $300_1$ as the cluster head. Upon receiving positive confirmation from some or all of the vehicles, the computing device of autonomous vehicle $300_1$ requests that each vehicle transmit their vision data and intended trajectories at the four way stop to it. Autonomous vehicle $300_1$ compiles the intended trajectories and displays a group eHMI notification $310_1$ on its front windshield, front grill or rooftop display. The group eHMI notification may display a grid and text or symbols showing whether each vehicle should stop or go. FIG. 4 shows an example a group eHMI notification which may be broadcast on display $310_1$ of autonomous vehicle $300_1$.

In a further aspect, the eHMI notification may not be displayed on autonomous vehicle $300_1$, but may be displayed on another autonomous vehicle, such as autonomous vehicle $300_3$. After autonomous vehicle $300_1$ passes through the intersection, autonomous vehicle $300_3$ may take over as the cluster head. Additionally, as each vehicle passes through the four-way stop intersection, another vehicle behind it may take its place. If the vehicle is an autonomous vehicle, it may be asked to join the mesh network and transmit its vision and trajectory information.

In an additional aspect, the four-way stop intersection may be equipped with an eHMI notification display on a lamp post or stand and may act as the cluster head to form a mesh network and add each autonomous vehicle as it approaches the intersection.

The eighth condition concerns the situation when all vehicles in an area are autonomous vehicles and there are no pedestrians, bicyclists, non-autonomous vehicles or other road users within the area. Since autonomous vehicles can communicate with each other through their internal communication devices, there is no need for eHMI notifications when all vehicles are autonomous vehicles, are working correctly and there are no road users the area. In this situation, all eHMI notifications can be suppressed.

The ninth suppression condition concerns the expression of the eHMI based on the time of day. On very bright, sunny days, the intensity of the display of the eHMI notifications should be turned down or off on some or all of the displays to avoid adding to reflection from metal parts and glass on other vehicles, which may blind a road user temporarily or may reproduce the eHMI in the rear window of a vehicle in front of the autonomous vehicle. EHMI notifications can be shortened or use icons only to convey the information in a more readable format.

Additionally, at night the light from the eHMI displays may add to glare and partially blind or confuse a road user. At night, a "heartbeat" light may be decreased in intensity or a different type of bulb may be activated, such as a halogen bulb (which does not produce as much glare as an incandescent bulb), in order to decrease the glare and the light "pollution" along the highway.

Figure 5A:
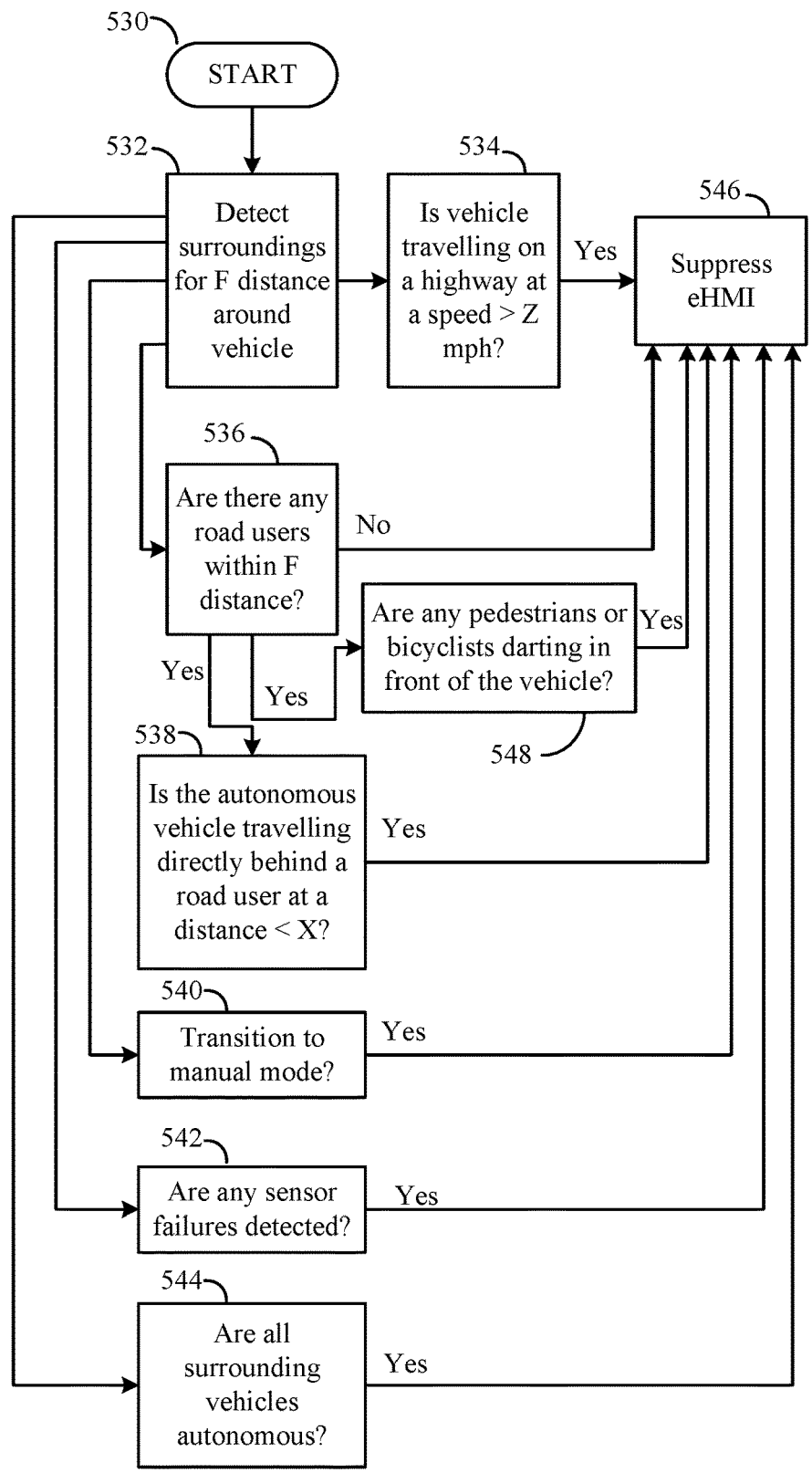
FIG. 5A is an exemplary flowchart for suppression conditions 1, 2, 3, 4, 6 and 8, according to certain embodiments.

FIGS. 5A, 5B, 5C and 5D are flow charts of the rules for suppression of the eHMI notifications. FIG. 5A shows the full suppression conditions as set forth in conditions 1, 2, 3, 4, 6 and 8. At step 530, the computing device of the autonomous vehicle starts monitoring for suppression conditions. At step 532, the computing device uses sensor readings (cameras, LiDAR, radar, etc.) to detect the external surroundings of the autonomous vehicle for a distance "F" around the vehicle. As discussed above, distance "F" may be any of 50 feet, 100 feet, 500 ft, 1000 feet, 1000 yards, greater than 1000 yards, and depends on the environmental region (urban, rural, suburbs, the speed limit of the roadway, environmental factors, or the like. At step 534, the computing device determines whether the autonomous vehicle is travelling on a highway at a speed >Z mph. As discussed above, "Z" may be set at 50 mph. Speeds below 50 mph on a highway (prohibited to pedestrians, bicyclists, or slow moving vehicles) may indicate road construction or an accident, thus eHMI notifications may be crucial to surrounding non-autonomous traffic. However, speeds >50 mph indicate smooth flowing traffic where the eHMI notification is not necessary and can be suppressed at step 546. At step 536, the computing device searches for road users within a distance <F. If there are no road users, the eHMI is suppressed at step 546. It there are road users within the F distance, the computing device determines at step 548 whether the autonomous vehicle is travelling behind another vehicle, autonomous or non-autonomous, at a relative distance <X. As discussed above, X is determined by the speed of the vehicle, weather conditions and road conditions, and may be a distance of 2 car lengths at 50 mph and may increase with increasing speeds. If the autonomous vehicle is a relative distance <X from the rear of another vehicle, the eHMI is suppressed at step 546 to avoid confusing or distracting the front vehicle. If there are road users within the F distance as checked at step 536, the computing device determines at step 548 whether there are any unanticipated moves by pedestrians or bicyclists which will cross its trajectory in less than a distance "D". D may be 5 feet, 10 feet, 20 feet, or the like depending on the speed of the autonomous vehicle.

The computing device checks at step 540 whether a transition to manual mode has been initiated by a passenger of the autonomous vehicle sitting in the driver's position. Many states require autonomous vehicles to have a human driver sitting in the driver's position and require that the driver have the capability of switching to manual mode. This may be advantageous when the driver wants to leave the programmed trajectory to visit a rest stop and does not want to change the set programming. When the driver transitions to manual mode, the eHMI is suppressed at step 546, and the driver handles the signaling.

The computing device checks whether any sensor failures have been detected at step 542. If YES, the eHMI is suppressed at step 546.

The computing device determines whether all surrounding vehicles are autonomous at step 544. If YES, then the eHMI is suppressed at step 546.

Steps 538 and 548 are dependent on step 536, but steps 536, 538, 542 and 544 can be performed in any order. All steps are continuously monitored by the computing device of the autonomous vehicle.

Figure 5B:
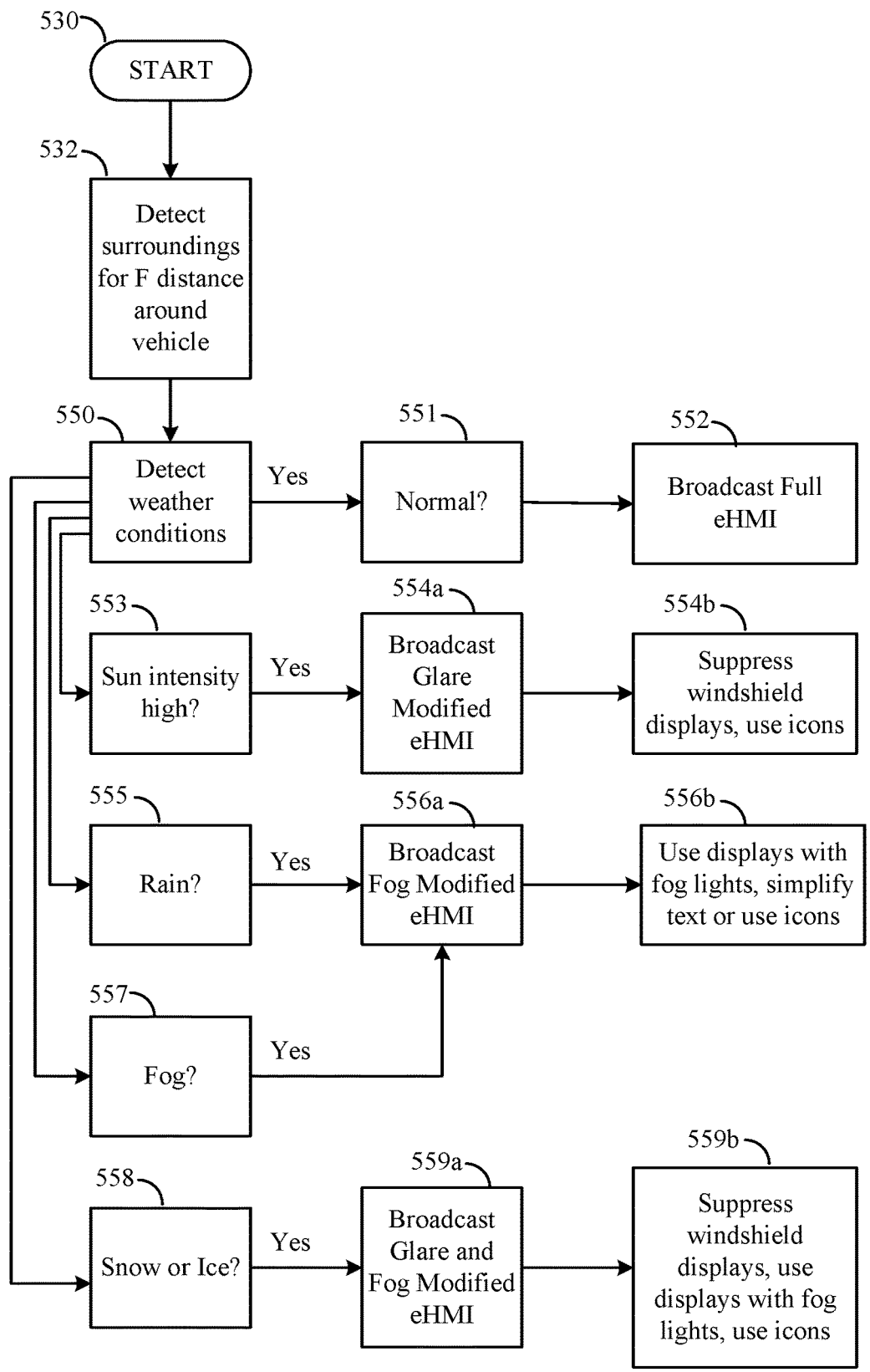
FIG. 5B is an exemplary flowchart for suppression condition 5, according to certain embodiments.

FIG. 5B is a flow chart of the conditional suppression conditions of condition 5. Steps 530 and 532 are identical to those of FIG. 5A. At step 550, weather conditions are detected. If the conditions are normal (no rain, snow, fog, ice or high intensity glare conditions) (step 551), the full eHMI is broadcast (step 552), i.e., eHMI notifications are broadcast on at least one of a plurality of display positions. For example, long text may be broadcast on a windshield display, icons on a front grill display, a flashing "heartbeat" light on the roof, short text on a rooftop display, long text on a rear window display, a flashing light bar on a door side, or the like. EHMI displays may be placed at multiple locations around the autonomous vehicle and may be of different sizes, have different types of bulbs (colored light, halogen lights), different types of displays (i.e., capable of displaying text only, icons only, text and icons, flashing light bars, etc.).

At step 553, if the sun intensity is high, glare can obscure an eHMI on a window display. The eHMI is glare modified (step 554a) by suppressing windshield displays and using icons, rather than text (step 554b).

At step 555 and 557, the computing device determines whether there the external environment is rainy or foggy respectively. If YES, a fog modified eHMI is broadcast at step 556a, and displays with fog lights are used while other displays are suppressed at step 556b. The text is simplified and icons are preferably used.

At step 558, the computing device determines whether there is snow or ice, both of which cause glare and may shield or distort eHMI notifications. If YES, then the computing device broadcasts as glare and fog modified eHMI in which windshield displays are suppressed, displays with fog lights are used while other displays are suppressed and icons or short text is used.

Figure 5C:
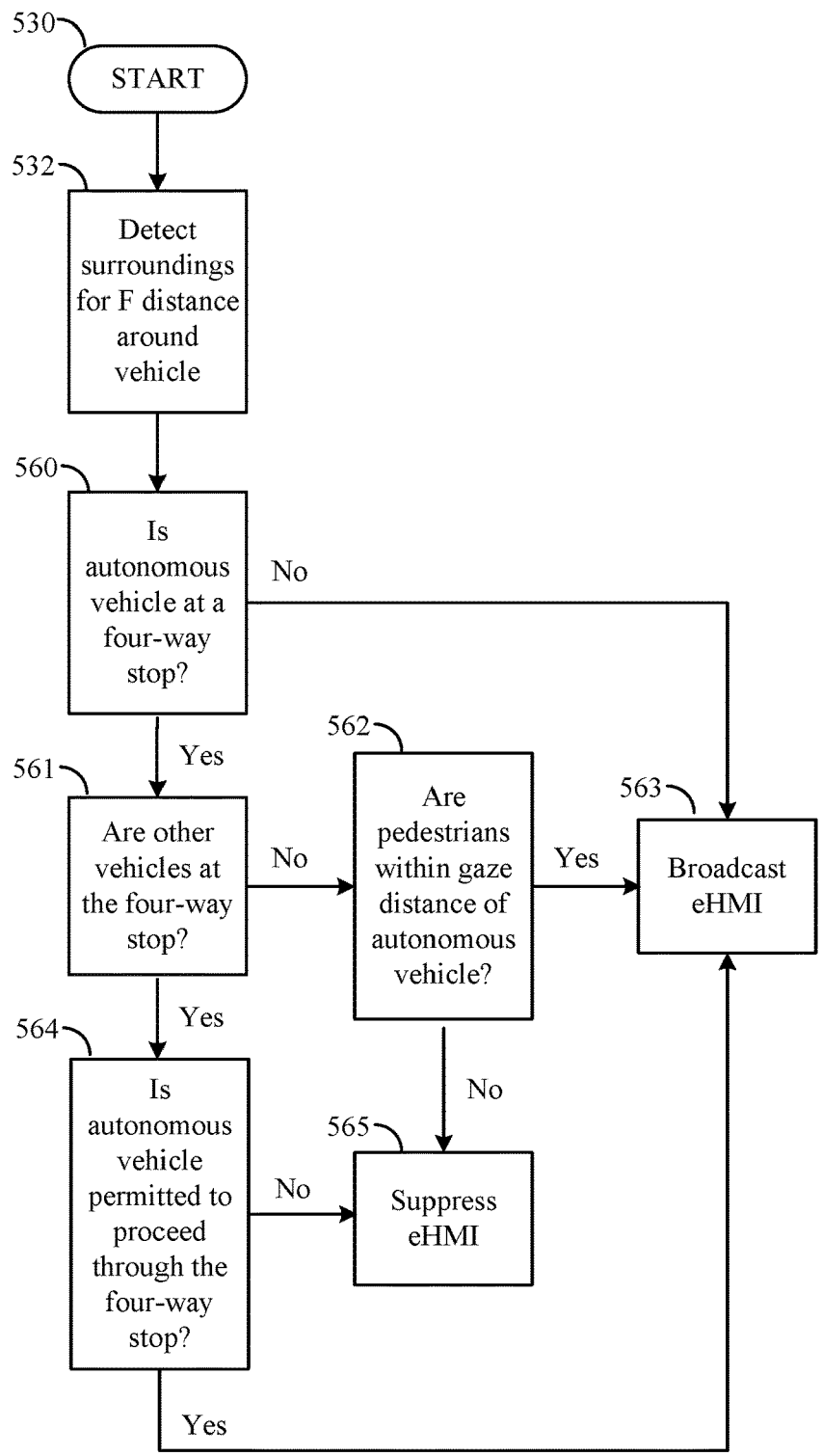
FIG. 5C is an exemplary flowchart for suppression condition 7, according to certain embodiments.

FIG. 5C is a flow chart of the conditional suppression conditions of condition 7 concerning suppression of the eHMI at a four way stop intersection. Steps 530 and 532 are the same as for FIG. 5A. At step 560, the computing device of the autonomous vehicle determines whether the autonomous vehicle is at a four-way stop. If not at a four-way stop, the autonomous vehicle continues to broadcast its eHMI notifications as appropriate at step 563. If the autonomous vehicle is at a four way stop, at step 561 the computing device determines whether there are other vehicles, autonomous or non-autonomous, at the four-way stop. If there are no other vehicles, at step 562 the computing device determines whether there are pedestrians within gaze distance of the autonomous vehicle. If there are pedestrians, the autonomous vehicle broadcasts its eHMI at step 563. If there are no pedestrians, the eHMI is suppressed at step 565.

If there are other vehicles at the four-way stop, the computing device determines whether or not the autonomous vehicle is permitted to proceed through the four-way stop (i.e., it is its turn) at step 564. If it is not permitted, the computing device suppresses the eHMI notifications at step 565. If it is permitted, the computing device broadcasts the eHMI at step 563.

Figure 5D:
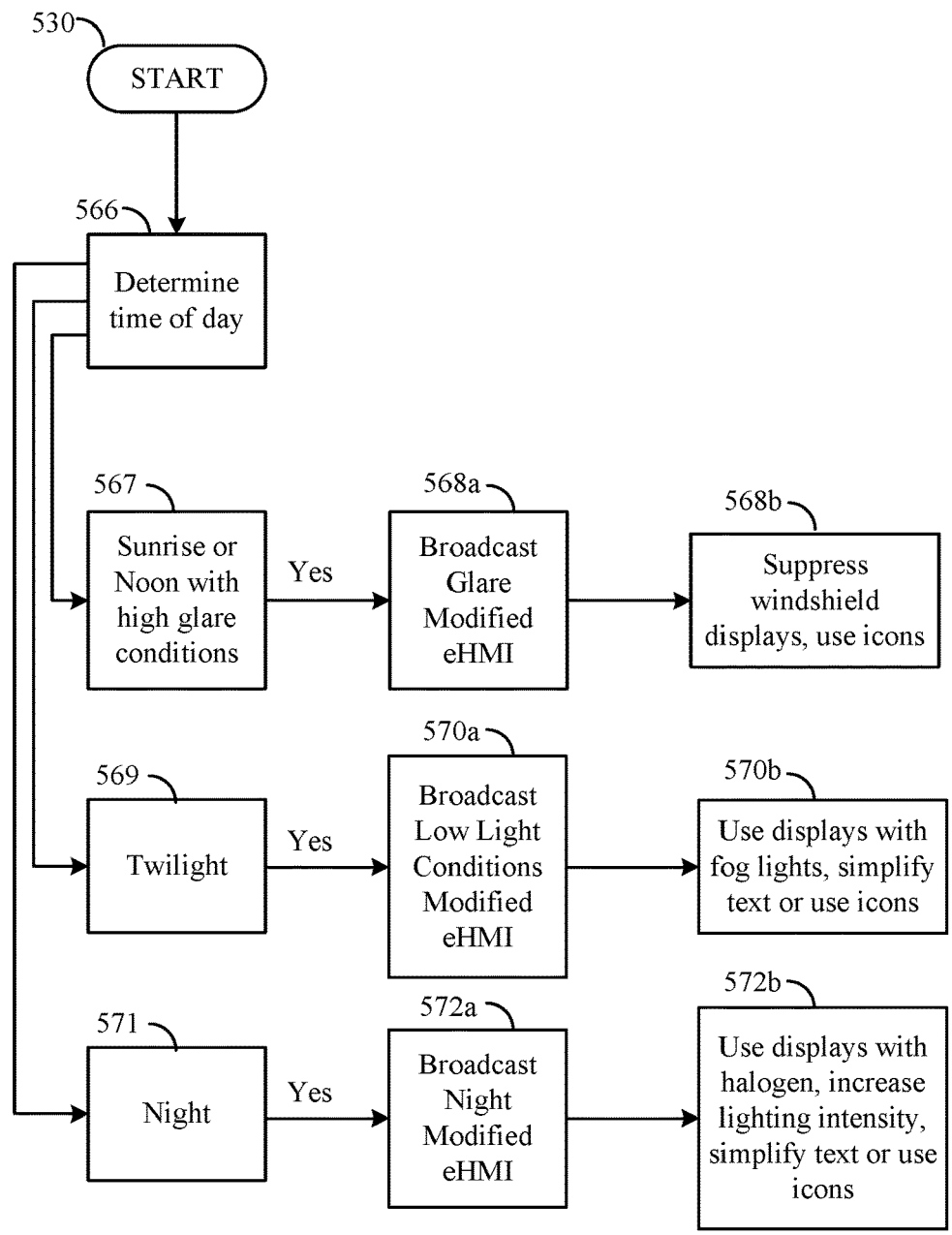
FIG. 5D is an exemplary flowchart for suppression condition 9, according to certain embodiments.

FIG. 5D is a flow chart of the conditional suppression conditions of step 9 concerning time of day. At step 566, the computing device retrieves the time of day from GPS or its internal clock.

If the time of day is sunrise or noon, at step 567, the computing device determines whether there are high glare conditions. If YES, the computing device modifies the eHMI notification based on the glare conditions at step 568a. At step 568b, the computing device suppresses windshield displays and broadcasts icons, rather than text eHMI notifications, as icons are easier to read by road users in the distortion due to glare.

If at step 569, the computing device determines the time of day is twilight, a low light conditions modified eHMI is broadcast at step 570a and the eHMI notifications are simplified text or icons. The displays should have halogen or fog lights to increase the visibility of the eHMI notification.

If at step 571, the computing device determines the time of day is night, the computing device modifies the eHMI for darkness conditions at step 572a. At step 572b, displays are used which have halogen or LED lamps, simplified text and icons are broadcast, and the intensity of lighting is increased.

Figure 6:
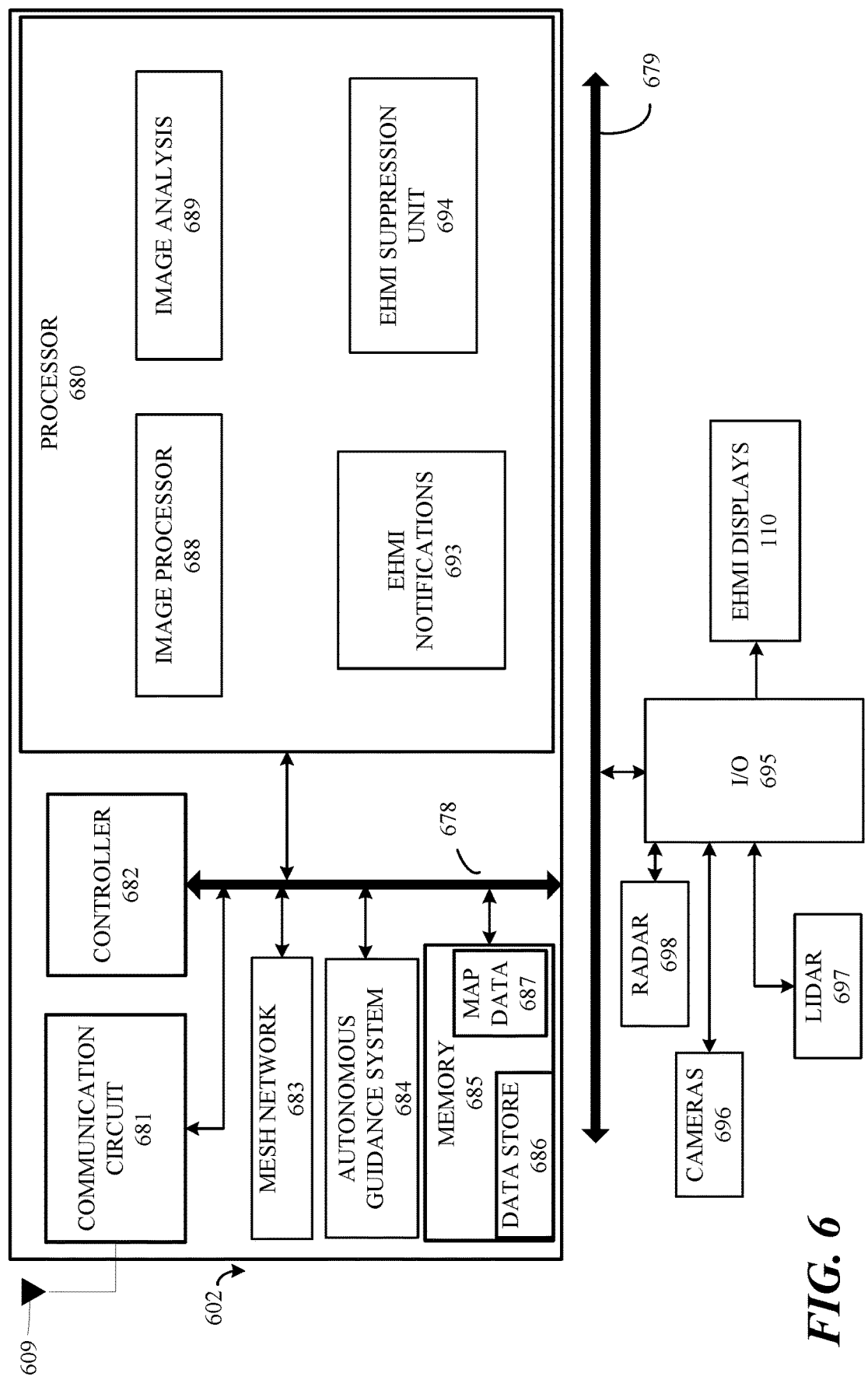
FIG. 6 is a block diagram of the computing device of the present disclosure, according to certain embodiments.

As shown in FIG. 6, an autonomous vehicle 100 includes a computing device 602 including a controller 682 and one or more processors 680. "Processor" means any component or group of components that are configured to execute any of the processes described herein or any form of instructions to carry out such processes or cause such processes to be performed. The processor 680 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 680 can include at least one hardware circuit (e.g., an integrated circuit) configured to carry out instructions contained in program code. In arrangements in which there are a plurality of processors 680, such processors can work independently from each other or one or more processors can work in combination with each other. In one or more arrangements, the processor 680 can be a main processor of the vehicle 100. For instance, the processor 680 can be an engine control unit (ECU).

The computing device can include one or more data stores 686 for storing one or more types of data. The data store can include volatile and/or non-volatile memory (685). Examples of suitable data stores 686 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 686 can be operatively connected to the processor 680 for use thereby. The term "operatively connected," as used throughout this description, can include direct or indirect connections, including connections without direct physical contact.

In one or more arrangements, the one or more data stores 686 can include map data 687. The map data 687 can include maps of one or more geographic areas. The map data 687 can include information or data on roads, traffic control devices, road markings, structures, features, and/or landmarks in the one or more geographic areas. The map data 687 can be in any suitable form. In some instances, the map data 687 can include aerial views of an area. In some instances, the map data 687 can include ground views of an area, including 360 degree ground views. The map data 687 can be highly detailed. In some instances, the map data 687 can be located onboard the vehicle 100. Alternatively, at least a portion of the map data 687 can be located in a data store or source that is remote from the vehicle 100. The map data 687 can include terrain data. The terrain data can include information about the terrain of one or more geographic areas. The terrain data can include elevation data in the one or more geographic areas. In some instances, the terrain data can be located onboard the vehicle 100. The map data 687 can include a digital map with information about road geometry.

The computing device includes a first bus line 678 for connecting the internal components and a second bus line 679 for connecting the computing device with the vehicle sensors, lighting, eHMI displays and other vehicle systems.

The vehicle 100 can include an autonomous guidance system 684. The autonomous guidance system 684 can include instructions (e.g., program logic) executable by the processor 680. Such instructions can include instructions to execute various vehicle functions and/or to transmit data to, receive data from, interact with, and/or control the vehicle 100 or one or more systems thereof (e.g. one or more of vehicle systems). Alternatively or in addition, the data store 686 may contain such instructions. The autonomous guidance system 684 can be configured to determining path(s), current driving maneuvers for the autonomous vehicle, future driving maneuvers and/or modifications to current driving maneuvers. The autonomous guidance system 684 can also cause, directly or indirectly, such path(s), driving maneuvers, and/or modifications thereto to be implemented.

The computing device 602 is equipped with an eHMI notification device 693 which may include circuitry and program instructions implemented by processor 680. The computing device includes an antenna 609 and communication circuit 681 which are configured to communicate with nearby autonomous vehicles. The computing device further includes a controller 682. The processor 680 includes an image processor 688, image analysis unit 689, an eHMI notification unit 693 and an eHMI suppression unit 694. The eHMI suppression unit 694 determines the suppression, continuance or enhancement of each eHMI notification, the type of eHMI display to use and the best location for an eHMI display for a particular eHMI notification under the suppression conditions.

The computing device is configured to operate the cameras 696, LiDAR sensors 697 and radar sensors 698 of the autonomous vehicle to image the surrounding environment. The computing device includes a memory storing program instructions which may be accessed by the image processor 688 and/or the processor 680. The processor is configured to access the program instructions to perform aspects of the present disclosure. The image processor 688 includes circuitry configured to execute the program instructions to receive the images from the cameras, LiDAR sensors, timestamp the images and provide the timestamped images to the image analysis unit 689 for further analysis. The image analysis unit 689 is configured to execute program instructions to stitch together the sensor images and combine the stitched images with map data 687 to form a global view of the external surroundings of the autonomous vehicle. The image analysis unit is configured with program instructions to perform road user head pose, body posture and trajectory estimation to identify a pedestrian and his/her body positions over a series of images. The processor is further configured to determine gaze direction 688 of the pedestrian(s).

The processor includes program instructions to perform mesh network 683 formation with nearby autonomous vehicles. The computing device 602 operates as the cluster head in the mesh network. The choice of a cluster head is generally determined by the connectivity status of a vehicle, such a connected, a good connection, a poor data connection, or the like, the type of communication device in the vehicle (3G, 4G, 5G, etc.) and the amount of power available for communication. For example, an autonomous vehicle which is close to a recharge state would not act as the cluster head. The correlation unit is configured to concatenate the views from each autonomous vehicle, correlate these views with the trajectories of each autonomous vehicle and each road user and identify the road users which would benefit from an eHMI notification. The eHMI determination unit is configured to determine the notification to be presented to road users from a plurality of messages stored in data store 686 connected to memory 685.

The computing device 602 may access one or more sensors configured to sense the external environment of the vehicle 100 or portions thereof. For instance, the sensors can be configured to acquire data of at least a portion of an external environment of the vehicle 100. For instance, the sensors can be configured to acquire data of at least a forward portion of an external environment of the vehicle 100. "Forward portion" means a portion of the external environment that is located in front of the vehicle in the travel direction of the vehicle. The forward portion can include portion of the external environment that are offset from the vehicle in the right and/or left lateral directions. Such environmental sensors can be configured to detect, determine, assess, monitor, measure, quantify and/or sense objects in at least a portion of the external environment of the vehicle 100 and/or information/data about such objects. Various examples of such sensors have been described herein. However, it will be understood that the embodiments are not limited to the particular sensors described.

The autonomous guidance system 684, and/or the processor 680 can control the navigation and/or maneuvering of the vehicle 100 by controlling one or more of vehicle systems and/or components thereof. Such controlling can be performed directly or indirectly (e.g., by controlling one or more actuators).

The first embodiment is illustrated with respect to FIG. 1-FIG. 6. The first embodiment describes a method for suppression of external human machine interface (eHMI) notifications to prevent confusion or distraction of a road user, comprising suppressing the eHMI notifications of an autonomous vehicle 100, wherein suppressing is based on at least one suppression condition including: the autonomous vehicle is following another vehicle within a predetermined distance (See FIG. 1, where the predetermined distance is X), the autonomous vehicle is travelling on a high speed roadway on which road users are not present as shown in FIG. 2, the autonomous vehicle is transitioning to manual mode, detecting sensor failure, detecting a reduction in visibility of the eHMI based on adverse weather conditions (FIG. 5B), detecting a location of a road user within a proximity threshold (FIG. 5A), detecting autonomous and non-autonomous vehicles at a four way stop (5C), detecting that all vehicles within a threshold distance are autonomous vehicles, and detecting a reduction in visibility of the eHMI due to light intensity changes based on time of day (FIG. 5D).

The method further comprises calculating the predetermined distance based on a difference between a first speed of the autonomous vehicle and a second speed of the other vehicle that the autonomous vehicle is following as shown in FIG. 1.

The method further comprises suppressing the eHMI notifications on a high speed roadway when the autonomous vehicle is travelling at or above a speed limit of the high speed roadway, and broadcasting the eHMI notifications when the autonomous vehicle is travelling below the speed limit of the high speed roadway as shown in FIG. 2.

The method further comprises wherein transitioning to manual mode comprises controlling the autonomous vehicle by a human driver.

The method further comprises receiving image data from any one of a plurality of sensors of the autonomous vehicle, the sensors selected from the group including external cameras 696, LiDAR sensors 697 and radar sensors 698 (FIG. 6), processing the image data to form a view of the external environment surrounding the autonomous vehicle, combining the view of the environment with map data to generate a global view of the external environment, and identifying autonomous vehicles and road users in the global view.

The method further comprises determining a lack a confidence in the global view upon detecting sensor failure.

The method further comprises detecting adverse weather conditions in the global view of the external environment as shown in FIG. 5B, if the external environment includes high intensity sunlight (step 553), broadcasting only icons and disabling windshield displays (step 554*b*), if the external environment includes rain (step 555), simplifying eHMI text, broadcasting on eHMI displays which include fog lights and disabling eHMI displays which do not include fog lights step (556*b*), if the external environment includes fog (step 557), simplifying eHMI text and broadcasting on eHMI displays which include fog lights and disabling eHMI displays which do not include fog lights (556*b*), and if the external environment includes snow or ice (step 558), broadcasting only icons, broadcasting on eHMI displays which include fog lights and disabling eHMI displays which do not include fog lights (step 559*b*).

The method further comprises detecting a pedestrian 356 in the global view of the external environment, determining a distance of the pedestrian from the autonomous vehicle, determining if a trajectory of the pedestrian intersects with a trajectory of the autonomous vehicle, and, if the distance of the pedestrian from the autonomous vehicle is less than a proximity threshold and the trajectory of the pedestrian intersects with a trajectory of the autonomous vehicle, suppressing the eHMI notifications.

The method further comprises determining if the autonomous vehicle $300_1$ is located at a four-way stop intersection (305, step 560, FIG. 3A, 5C), detecting other vehicles (step 561; autonomous vehicles $300_2$, $300_3$, $300_4$, $300_5$, $300_6$ and non-autonomous vehicle $320_1$) located at the four-way stop intersection, determining whether the autonomous vehicle has a right-of-way (step 564, FIG. 5C), and if the autonomous vehicle does not have the right-of-way, suppressing the eHMI notifications (step 565).

As shown in FIG. 3B, the method further comprises determining whether at least one the other vehicles located at the four-way stop intersection is a connected vehicle, requesting that each connected vehicle form a mesh network with the autonomous vehicle, forming the mesh network upon receiving a confirmation from each connected vehicle, designating the autonomous vehicle as the cluster head of the mesh network, determining a right-of-way sequence for each vehicle located at the four-way stop intersection, requesting that each connected vehicle suppress its eHMI notifications, and displaying a group eHMI notification on a front display of the autonomous vehicle (see $310_1$ on vehicle $300_1$, FIG. 3B).

The method further comprises determining the threshold distance based on the distance from the autonomous vehicle to a boundary of the global view.

As shown in FIG. 5D, the method further comprises determining the time of day (step 566), determining a light intensity in the global view of the external environment, if the time of day is sunrise and the light intensity is high (step 567), broadcasting a glare modified eHMI notification (step 568*a*) using only icons and suppressing windshield displays (step 568*b*), if the time of day is noon (step 567) and the light intensity is high, broadcasting a glare modified eHMI notification (step 568*a*) using only icons and suppressing windshield displays (step 568*b*), if the time of day is twilight (step 569) and the light intensity is low, broadcasting a low light conditions modified eHMI notification (step 570*a*) using simplified text and icons, displaying the low light conditions modified eHMI notification only on displays having fog lights, halogen bulbs or LED bulbs (step 570*b*), and if the time of day is night (step 571) and the light intensity is very low, broadcasting a night modified eHMI notification (step 572*a*) using simplified text and icons, displaying the low light conditions modified eHMI notification only on displays having fog lights, halogen bulbs or LED bulbs while suppressing all other displays of the autonomous vehicle (step 572*b*).

The second embodiment is illustrated with respect to FIG. 1-FIG. 6. The second embodiment describes a system for suppression of autonomous vehicle 100 external human machine interface (eHMI) notifications to prevent confusion of a road user, comprising a plurality of sensors configured to generate images of the surrounding environment, the plurality of sensors including vehicle external cameras 696, LiDAR sensors 697 and radar sensors 698, a plurality of eHMI notification displays located at different external positions (generally 310, FIG. 3A) wherein the plurality of notification displays are configured for independent activation, a computing device (602, FIG. 6) operatively connected to the plurality of sensors and plurality of notification devices, the computing device including a computer-readable medium comprising program instructions, executable by processing circuitry (see processor 680), to cause the processing circuitry to suppress the eHMI notifications (see eHMI suppression unit 694) based on at least one suppression condition including the autonomous vehicle is following another vehicle within a predetermined distance (FIG. 1, 5A), the autonomous vehicle is travelling on a high speed roadway on which road users are not present (FIG. 2), the autonomous vehicle is transitioning to manual mode, detecting sensor failure, detecting a reduction in visibility of the eHMI based on adverse weather conditions (FIG. 5B), detecting a location of a road user within a proximity threshold, detecting autonomous and non-autonomous vehicles at a four way stop (FIG. 5C), detecting that all vehicles within a threshold distance are autonomous vehicles, and detecting a reduction in visibility of the eHMI due to light intensity changes based on time of day (FIG. 5D).

The system includes wherein the computing device further comprises a controller 682 to receive image data from any one of a plurality of sensors, wherein the processing circuitry 680 further comprises an image processor 688 configured to timestamp the images, image analysis circuitry 689 configured to stitch together the images to form a view of the external environment surrounding the autonomous vehicle, combine the view of the environment with map data to generate a global view of the external environment and identify autonomous vehicles and road users in the global view.

The computing device further comprises communication circuitry (681 and mesh network circuitry 683) configured to identify autonomous vehicles in the global view, transmit requests to the autonomous vehicles in the global view to form a mesh network, and form the mesh network upon receiving confirmation of the requests.

The computing device further comprises a memory 685 storing a plurality of eHMI notification messages and a plurality of external display positions for each autonomous vehicle, an eHMI suppression unit 694 configured to determine a suppression status of the eHMI notification, an eHMI notification unit 693 configured to retrieve an eHMI notification based on the suppression status, and wherein the controller 682 is configured to transmit the eHMI notifications to the plurality of eHMI notification displays.

The processing circuitry is further configured to calculate the predetermined distance when the autonomous vehicle is following another vehicle based on a difference between a first speed of the autonomous vehicle and a second speed of the other vehicle, suppress the eHMI notifications on a high speed roadway when the autonomous vehicle is travelling at or above a speed limit of the high speed roadway (FIG. 1) and broadcast the eHMI notifications when the autonomous vehicle is travelling below the speed limit of the high speed roadway, determine a lack a confidence in the global view upon detecting sensor failure, detect adverse weather conditions (FIG. 5B) in the global view of the external environment, and if the external environment includes high intensity sunlight, broadcast only icons and disable windshield displays, if the external environment includes rain, simplify eHMI text, broadcast on eHMI displays which include fog lights and disable eHMI displays which do not include fog lights, if the external environment includes fog, simplify eHMI text and broadcast on eHMI displays which include fog lights and disable eHMI displays which do not include fog lights, if the external environment includes snow or ice, broadcast only icons, broadcast on eHMI displays which include fog lights and disable eHMI displays which do not include fog lights, determine the time of day and the light intensity in the global view of the external environment (FIG. 5D), and if the time of day is sunrise and the light intensity is high, broadcast a glare modified eHMI notification using only icons and suppress windshield displays, if the time of day is noon and the light intensity is high, broadcast a glare modified eHMI notification using only icons and suppress windshield displays, if the time of day is twilight and the light intensity is low, broadcast a low light conditions modified eHMI notification using simplified text and icons, display the low light conditions modified eHMI notification only on displays having fog lights, halogen bulbs or LED bulbs, and if the time of day is night and the light intensity is very low, broadcast a night modified eHMI notification using simplified text and icons, display the low light conditions modified eHMI notification only on displays having fog lights, halogen bulbs or LED bulbs and suppress all other displays of the autonomous vehicle, and detect a pedestrian in the global view of the external environment, determine a distance of the pedestrian from the autonomous vehicle, determine whether a trajectory of the pedestrian intersects with a trajectory of the autonomous vehicle and, if the distance of the pedestrian from the autonomous vehicle is less than the proximity threshold and the trajectory of the pedestrian intersects with the trajectory of the autonomous vehicle, suppress the eHMI notifications.

As shown in FIG. 3A and FIG. 5C, the computing device is further configured to determine if the autonomous vehicle is located at a four-way stop intersection, detect other vehicles located at the four-way stop intersection, determine whether the autonomous vehicle has a right-of-way, and if the autonomous vehicle does not have the right-of-way, suppress the eHMI notifications.

The computing device is further configured to determine whether at least one of the other vehicles located at the four-way stop intersection is a connected vehicle, request that each connected vehicle form a mesh network with the autonomous vehicle, form the mesh network upon receiving a confirmation from each connected vehicle, designate the autonomous vehicle as the cluster head of the mesh network, determine a right-of-way sequence for each vehicle located at the four-way stop intersection, request that each connected vehicle suppress its eHMI notifications, and display a group eHMI notification on a front display of the autonomous vehicle.

The third embodiment is illustrated with respect to FIG. 1-FIG. 10. The third embodiment describes a non-transitory computer readable medium having instructions stored therein that, when executed by one or more processors, cause the one or more processors to perform a method for suppression of external human machine interface (eHMI) notifications to prevent confusion or distraction of a road user, comprising a method for suppression of external human machine interface (eHMI) notifications to prevent confusion or distraction of a road user, comprising suppressing the eHMI notifications of an autonomous vehicle 100, wherein suppressing is based on at least one suppression condition including: the autonomous vehicle is following another vehicle within a predetermined distance (See FIG. 1, where the predetermined distance is X), the autonomous vehicle is travelling on a high speed roadway on which road users are not present as shown in FIG. 2, the autonomous vehicle is transitioning to manual mode, detecting sensor failure, detecting a reduction in visibility of the eHMI based on adverse weather conditions (FIG. 5B), detecting a location of a road user within a proximity threshold (FIG. 5A), detecting autonomous and non-autonomous vehicles at a four way stop (5C), detecting that all vehicles within a threshold distance are autonomous vehicles, and detecting a reduction in visibility of the eHMI due to light intensity changes based on time of day (FIG. 5D).

Although the computing device for eHMI suppression is shown in a single system, the computing device may be distributed across multiple systems and/or integrated into an autonomous vehicle controller. Additionally, processor modules may be performed by any number of different computers and/or systems. Thus, the modules may be separated into multiple services and/or over multiple different systems within the vehicle to perform the functionality described herein.

Figure 7:
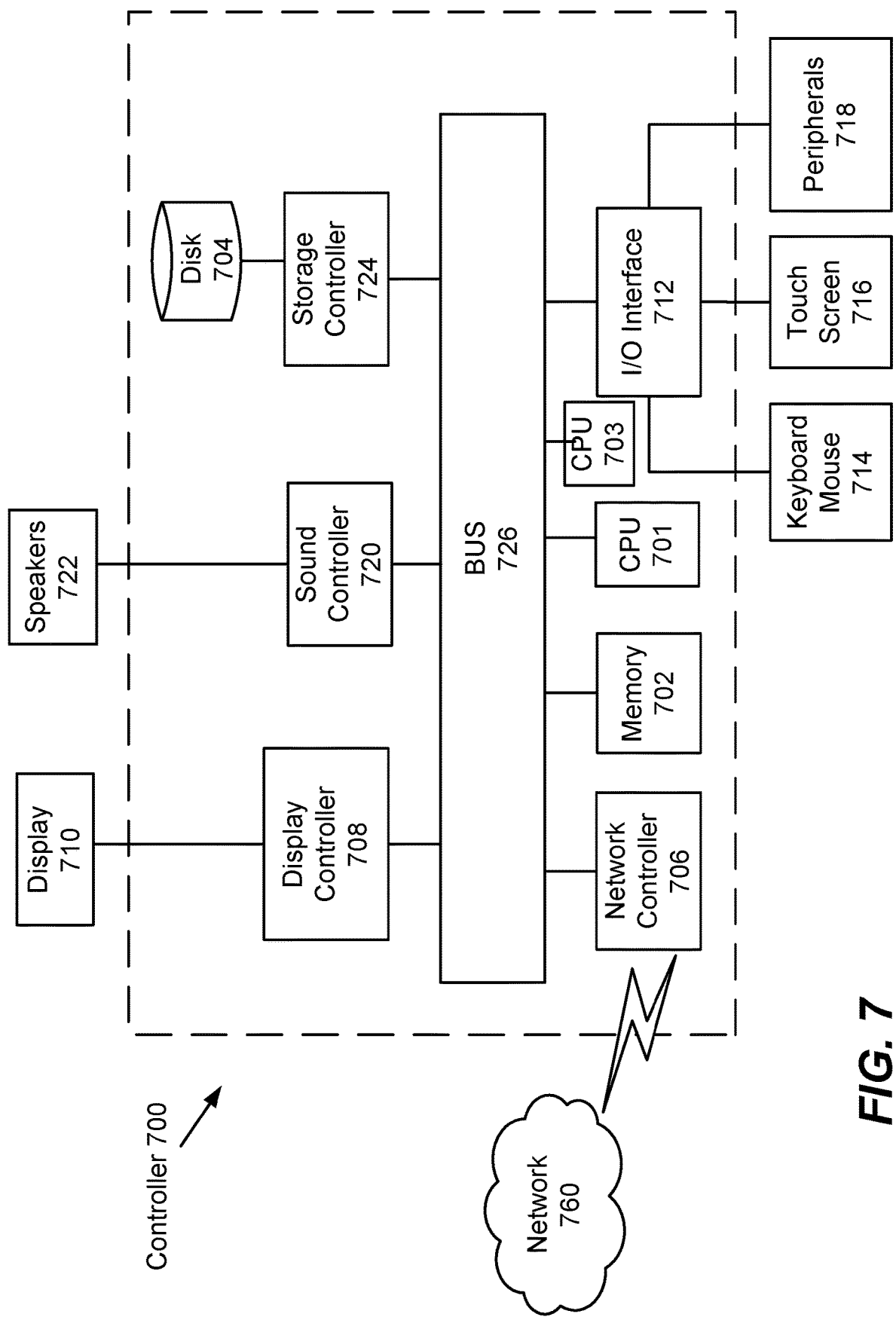
FIG. 7 is an illustration of a non-limiting example of details of computing hardware used in the computing device, according to certain embodiments.

Next, further details of the hardware description of the computing environment of FIG. 6 according to exemplary embodiments is described with reference to FIG. 7. In FIG. 7, a controller 700 is described is representative of the computing device 602 of FIG. 6 which includes a CPU 701 which performs the processes described above/below. The process data and instructions may be stored in memory 702. These processes and instructions may also be stored on a storage medium disk 704 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 701, 703 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN subnetworks. The network 760 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
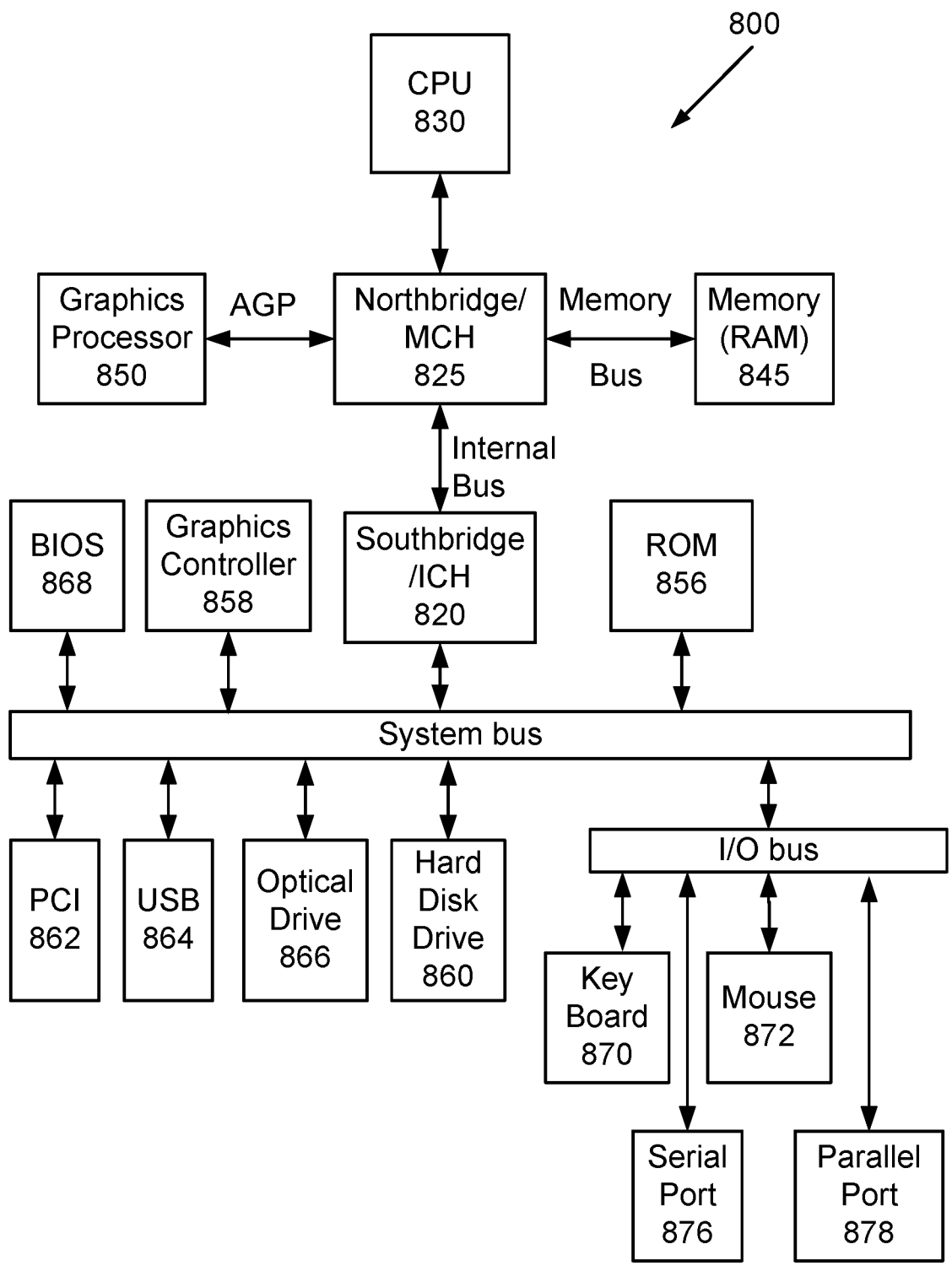
FIG. 8 is an exemplary schematic diagram of a data processing system used within the computing device, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
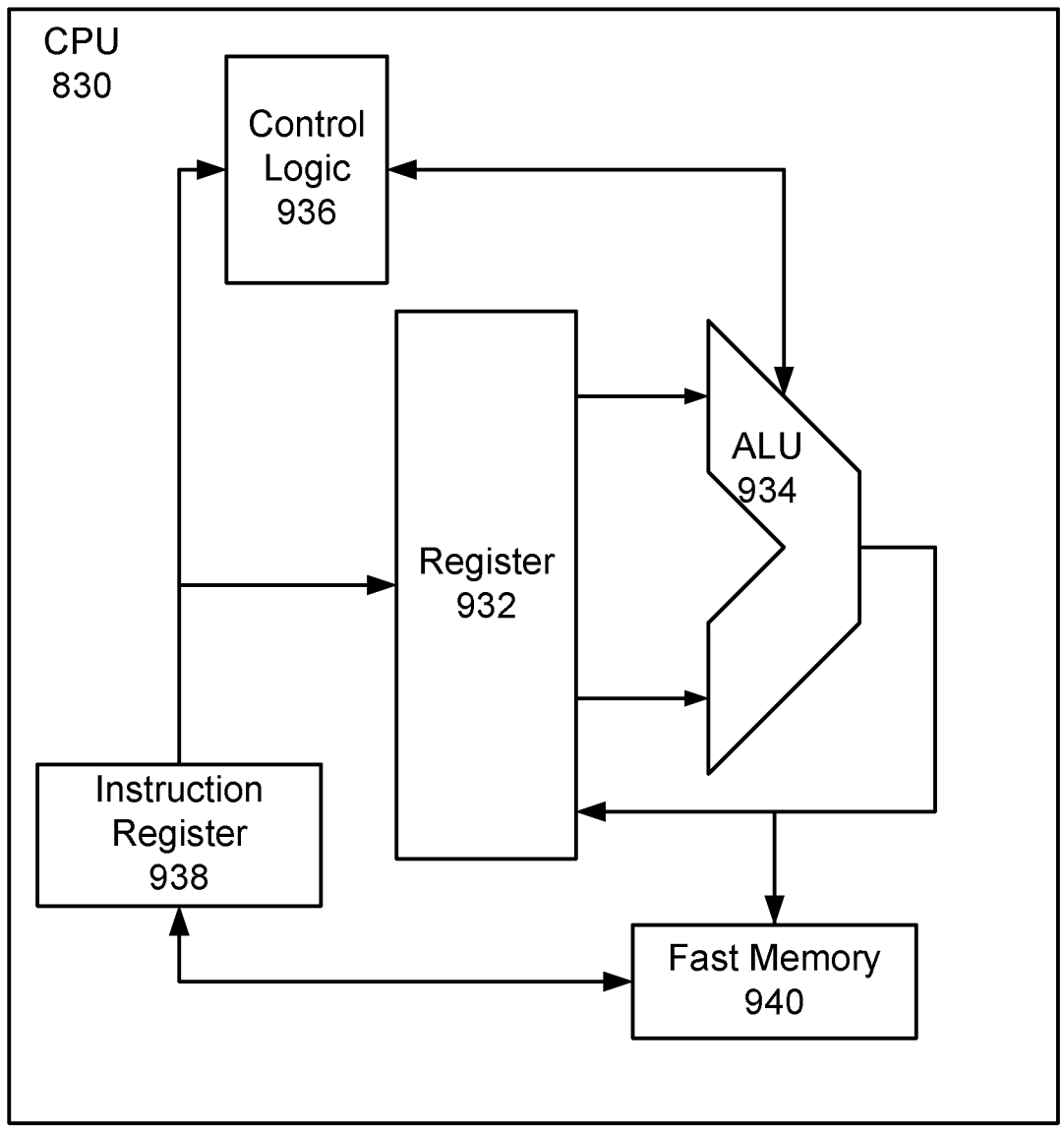
FIG. 9 is an exemplary schematic diagram of a processor used with the computing device, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 10:
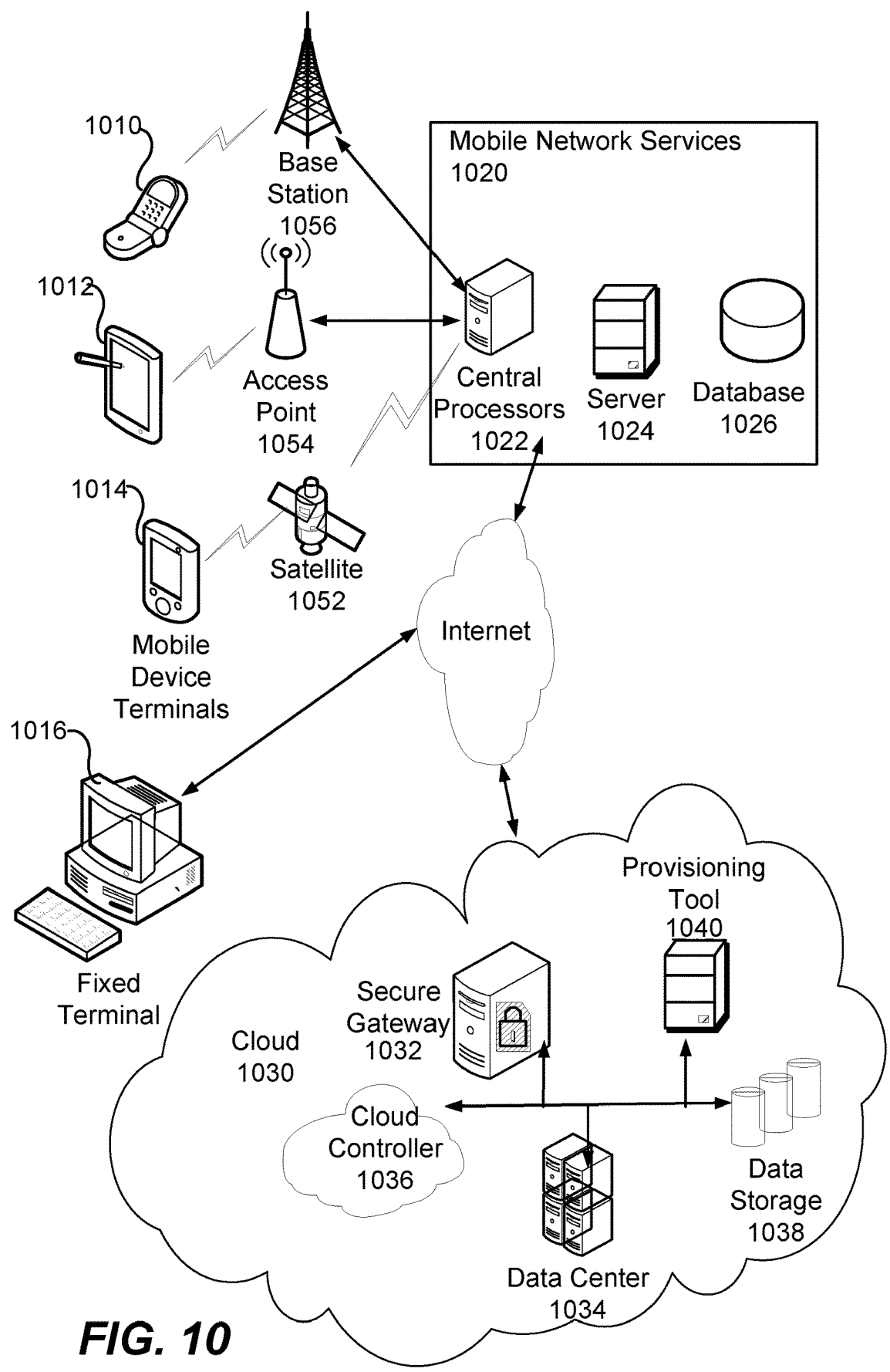
FIG. 10 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method for suppression of external human machine interface (eHMI) notifications to prevent confusion or distraction of a road user, comprising:
   suppressing the eHMI notifications of an autonomous vehicle, wherein the suppressing is based on at least one suppression condition including:
   the autonomous vehicle is following another vehicle within a predetermined distance;
   the autonomous vehicle is travelling on a high speed roadway on which road users are not present;
   the autonomous vehicle is transitioning to manual mode;
   detecting sensor failure;
   detecting a reduction in visibility of the eHMI based on adverse weather conditions;
   detecting that all vehicles within a threshold distance are autonomous vehicles; and
   detecting a reduction in visibility of the eHMI due to light intensity changes based on time of day.

2. The method of claim 1, further comprising:
   suppressing the eHMI notifications on a high speed roadway when the autonomous vehicle is travelling at or above a speed limit of the high speed roadway; and
   broadcasting the eHMI notifications when the autonomous vehicle is travelling below the speed limit of the high speed roadway.

3. The method of claim 1, wherein transitioning to the manual mode comprises controlling the autonomous vehicle by a human driver.

4. The method of claim 1, further comprising:
   receiving image data from any one of a plurality of sensors of the autonomous vehicle, the sensors selected from the group including external cameras, LiDAR sensors, and radar sensors;
   processing the image data to form a view of an external environment surrounding the autonomous vehicle;
   combining the view of the external environment with map data to generate a global view of the external environment; and
   identifying autonomous vehicles and road users in the global view.

5. The method of claim 4, further comprising:
   determining a lack a confidence in the global view upon detecting sensor failure.

6. The method of claim 4, further comprising:
   detecting adverse weather conditions in the global view of the external environment;
   when the external environment includes high intensity sunlight, broadcasting only icons and disabling windshield displays;
   when the external environment includes rain, simplifying eHMI text, broadcasting on eHMI displays which include fog lights, and disabling eHMI displays which do not include fog lights;
   when the external environment includes fog, simplifying eHMI text, broadcasting on eHMI displays which include fog lights, and disabling eHMI displays which do not include fog lights; and
   when the external environment includes snow or ice, broadcasting only icons, broadcasting on eHMI displays which include fog lights, and disabling eHMI displays which do not include fog lights.

7. The method of claim 4, further comprising:
detecting a pedestrian in the global view of the external environment;
determining a distance of the pedestrian from the autonomous vehicle;
determining if a trajectory of the pedestrian intersects with a trajectory of the autonomous vehicle; and
when the distance of the pedestrian from the autonomous vehicle is less than a proximity threshold and the trajectory of the pedestrian intersects with a trajectory of the autonomous vehicle, suppressing the eHMI notifications.

8. The method of claim 1, further comprising:
determining if the autonomous vehicle is located at a four-way stop intersection;
detecting other vehicles located at the four-way stop intersection;
determining whether the autonomous vehicle has a right-of-way; and
when the autonomous vehicle does not have the right-of-way, suppressing the eHMI notifications.

9. The method of claim 8, further comprising:
determining whether at least one the other vehicles located at the four-way stop intersection is a connected vehicle;
requesting that each connected vehicle form a mesh network with the autonomous vehicle;
forming the mesh network upon receiving a confirmation from each connected vehicle;
designating the autonomous vehicle as a cluster head of the mesh network;
determining a right-of-way sequence for each vehicle located at the four-way stop intersection;
requesting that each connected vehicle suppress its eHMI notifications; and
displaying a group eHMI notification on a front display of the autonomous vehicle.

10. The method of claim 4, further comprising:
determining the threshold distance based on the distance from the autonomous vehicle to a boundary of the global view.

11. The method of claim 4, further comprising:
determining the time of day;
determining the light intensity in the global view of the external environment;
when the time of day is sunrise and the light intensity is high, broadcasting a glare modified eHMI notification using only icons and suppressing windshield displays;
when the time of day is noon and the light intensity is high, broadcasting a glare modified eHMI notification using only icons and suppressing windshield displays;
when the time of day is twilight and the light intensity is low, broadcasting a low light conditions modified eHMI notification using simplified text and icons and displaying the low light conditions modified eHMI notification only on displays having fog lights, halogen bulbs, or LED bulbs; and
when the time of day is night and the light intensity is very low, broadcasting a night modified eHMI notification using simplified text and icons and displaying the low light conditions modified eHMI notification only on displays having fog lights, halogen bulbs, or LED bulbs while suppressing all other displays of the autonomous vehicle.

12. The method of claim 1, wherein the at least one suppression condition further includes at least one of:
detecting autonomous and non-autonomous vehicles at a four way stop; and
detecting a location of road user within a proximity threshold.

13. The method of claim 1, further comprising:
calculating the predetermined distance based on a difference between a first speed of the autonomous vehicle and a second speed of the other vehicle that the autonomous vehicle is following.

14. A system for suppression of autonomous vehicle external human machine interface (eHMI) notifications to prevent confusion or distraction of a road user, comprising:
a plurality of sensors configured to generate images of a surrounding environment, the plurality of sensors including vehicle external cameras, LiDAR sensors and radar sensors;
a plurality of eHMI notification displays located at different external positions, wherein the plurality of notification displays are configured for independent activation;
a computing device operatively connected to the plurality of sensors and plurality of notification devices, the computing device including a computer-readable medium comprising program instructions, executable by processing circuitry, to cause the processing circuitry to suppress the eHMI notifications based on at least one suppression condition including:
the autonomous vehicle is following another vehicle within a predetermined distance;
the autonomous vehicle is travelling on a high speed roadway on which road users are not present;
the autonomous vehicle is transitioning to manual mode;
detecting sensor failure;
detecting a reduction in visibility of the eHMI based on adverse weather conditions;
detecting that all vehicles within a threshold distance are autonomous vehicles; and
detecting a reduction in visibility of the eHMI due to light intensity changes based on time of day.

15. The system of claim 14, wherein the computing device further comprises:
a controller configured to receive image data from any one of the plurality of sensors,
wherein the processing circuitry further comprises:
an image processor configured to timestamp the images; and
image analysis circuitry configured to:
stitch together the images to form a view of an external environment surrounding the autonomous vehicle,
combine the view of the external environment with map data to generate a global view of the external environment, and
identify autonomous vehicles and road users in the global view.

16. The system of claim 15, wherein the computing device further comprises communication circuitry configured to:
identify autonomous vehicles in the global view;
transmit requests to the autonomous vehicles in the global view to form a mesh network; and
form the mesh network upon receiving confirmation of the requests.

17. The system of claim 14, wherein the computing device further comprises:
a memory storing a plurality of eHMI notification messages and a plurality of external display positions for each autonomous vehicle;
an eHMI suppression unit configured to determine a suppression status of the eHMI notification;
an eHMI notification unit configured to retrieve an eHMI notification based on the suppression status; and
wherein the controller is configured to transmit the eHMI notifications to the plurality of eHMI notification displays.

18. The system of claim 16, wherein the processing circuitry is further configured to:
suppress the eHMI notifications on a high speed roadway when the autonomous vehicle is travelling at or above a speed limit of the high speed roadway and broadcast the eHMI notifications when the autonomous vehicle is travelling below the speed limit of the high speed roadway;
determine a lack a confidence in the global view upon detecting sensor failure;
detect adverse weather conditions in the global view of the external environment, and if:
the external environment includes high intensity sunlight, broadcast only icons and disable windshield displays,
the external environment includes rain, simplify eHMI text, broadcast on eHMI displays which include fog lights, and disable eHMI displays which do not include fog lights,
the external environment includes fog, simplify eHMI text, broadcast on eHMI displays which include fog lights, and disable eHMI displays which do not include fog lights,
the external environment includes snow or ice, broadcast only icons, broadcast on eHMI displays which include fog lights, and disable eHMI displays which do not include fog lights;
determine the time of day and the light intensity in the global view of the external environment, and if:
the time of day is sunrise and the light intensity is high, broadcast a glare modified eHMI notification using only icons and suppress windshield displays,
the time of day is noon and the light intensity is high, broadcast a glare modified eHMI notification using only icons and suppress windshield displays,
the time of day is twilight and the light intensity is low, broadcast a low light conditions modified eHMI notification using simplified text and icons and display the low light conditions modified eHMI notification only on displays having fog lights, halogen bulbs, or LED bulbs, and
the time of day is night and the light intensity is very low, broadcast a night modified eHMI notification using simplified text and icons and display the low light conditions modified eHMI notification only on displays having fog lights, halogen bulbs, or LED bulbs and suppress all other displays of the autonomous vehicle; and
detect a pedestrian in the global view of the external environment, determine a distance of the pedestrian from the autonomous vehicle, determine whether a trajectory of the pedestrian intersects with a trajectory of the autonomous vehicle and, if the distance of the pedestrian from the autonomous vehicle is less than a proximity threshold and the trajectory of the pedestrian intersects with the trajectory of the autonomous vehicle, suppress the eHMI notifications.

19. The system of claim 14, wherein the processing circuitry is further configured to:
determine if the autonomous vehicle is located at a four-way stop intersection;
detect other vehicles located at the four-way stop intersection;
determine whether the autonomous vehicle has a right-of-way; and
when the autonomous vehicle does not have the right-of-way, suppress the eHMI notifications.

20. The system of claim 19, wherein the processing circuitry is further configured to:
determine whether at least one of the other vehicles located at the four-way stop intersection is a connected vehicle;
request that each connected vehicle form a mesh network with the autonomous vehicle;
form the mesh network upon receiving a confirmation from each connected vehicle;
designate the autonomous vehicle as a cluster head of the mesh network;
determine a right-of-way sequence for each vehicle located at the four-way stop intersection;
request that each connected vehicle suppress its eHMI notifications; and
display a group eHMI notification on a front display of the autonomous vehicle.

21. The system of claim 14, wherein the at least one suppression condition further includes at least one of:
detecting autonomous and non-autonomous vehicles at a four way stop; and
detecting a location of road user within a proximity threshold.

22. The system of claim 14, wherein the processing circuitry is further configured to:
calculate the predetermined distance when the autonomous vehicle is following another vehicle based on a difference between a first speed of the autonomous vehicle and a second speed of the other vehicle.

23. A non-transitory computer readable medium having instructions stored therein that, when executed by one or more processors, cause the one or more processors to perform a method for suppression of external human machine interface (eHMI) notifications to prevent confusion or distraction of a road user, comprising:
suppressing the eHMI notifications of an autonomous vehicle, wherein suppressing is based on at least one suppression condition including:
the autonomous vehicle is following another vehicle within a predetermined distance;
the autonomous vehicle is travelling on a high speed roadway on which road users are not present;
the autonomous vehicle is transitioning to manual mode;
detecting sensor failure;
detecting a reduction in visibility of the eHMI based on adverse weather conditions;
detecting that all vehicles within a threshold distance are autonomous vehicles; and
detecting a reduction in visibility of the eHMI due to light intensity changes based on time of day.

24. The non-transitory computer readable medium of claim 23, wherein the at least one suppression condition further includes at least one of:

detecting autonomous and non-autonomous vehicles at a four way stop; and detecting a location of road user within a proximity threshold.

\* \* \* \* \*